(12) United States Patent
Taboada et al.

(10) Patent No.: US 7,558,841 B2
(45) Date of Patent: Jul. 7, 2009

(54) METHOD, SYSTEM, AND COMPUTER-READABLE MEDIUM FOR COMMUNICATING RESULTS TO A DATA QUERY IN A COMPUTER NETWORK

(75) Inventors: Roberto C. Taboada, Duvall, WA (US); Eric D. Bailey, Redmond, WA (US); James N. Helfrich, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 660 days.

(21) Appl. No.: 10/438,366

(22) Filed: May 14, 2003

(65) Prior Publication Data

US 2004/0230666 A1    Nov. 18, 2004

(51) Int. Cl.
*G06F 15/16* (2006.01)
(52) U.S. Cl. .................. 709/219; 709/217; 709/218; 705/26; 715/700; 715/249
(58) Field of Classification Search ......... 709/217–219; 715/513, 523, 249, 700; 370/466–467
See application file for complete search history.

(56) References Cited

U.S. PATENT DOCUMENTS

| | | | |
|---|---|---|---|
| 4,209,915 A | 7/1980 | Keuleman et al. | 707/3 |
| 4,674,065 A | 6/1987 | Lange et al. | 382/311 |
| 4,791,587 A | 12/1988 | Doi | 364/900 |
| 4,868,750 A | 9/1989 | Kucera et al. | 711/2 |

(Continued)

FOREIGN PATENT DOCUMENTS

EP    0364180 A2    4/1990

(Continued)

OTHER PUBLICATIONS

U.S. Appl. No. 09/939,610, filed Aug. 28, 2001, entitled "System and Method for Transmitting and Retrieving Data Via A Distributed Persistence Framework."

(Continued)

*Primary Examiner*—Paul H Kang
*Assistant Examiner*—Mohamed Ibrahim
(74) *Attorney, Agent, or Firm*—Merchant & Gould, P.C.

(57) ABSTRACT

A method and system are provided for communicating results to a query for data in a computer network utilizing a graphical user interface. A framework on a client computer registers the client computer with an information service provider. Then the framework receives the query for data from the user interface. The framework creates a query packet including the query for data. A remote computer in communication with the framework resident on the local computing device receives the query packet from the framework and sends a response packet to the framework. After receiving the response packet, the framework determines whether the response packet contains a result to the data query. If the response packet contains a result to the data query, the framework formats the result for presentation to a user via the user interface on the local computing device. If the response packet, does not contain a result to the data query the framework may send a status message, indicating that no results were returned for the data query, to the user interface. The data in the query packet and the response packet may be formatted in a data format such as Extensible Markup Language ("XML").

20 Claims, 5 Drawing Sheets

U.S. PATENT DOCUMENTS

| | | | |
|---|---|---|---|
| 5,005,127 A | 4/1991 | Kugimiya et al. | 364/419 |
| 5,020,019 A | 5/1991 | Ogawa | 707/5 |
| 5,128,865 A | 7/1992 | Sadler | 704/2 |
| 5,159,552 A | 10/1992 | van Gasteren et al. | 704/1 |
| 5,251,130 A | 10/1993 | Andrews et al. | 364/419 |
| 5,267,155 A | 11/1993 | Buchanan et al. | 715/540 |
| 5,287,448 A | 2/1994 | Nicol et al. | 715/707 |
| 5,297,039 A | 3/1994 | Kanaegami et al. | 707/5 |
| 5,303,151 A | 4/1994 | Neumann | 364/999.999 |
| 5,317,546 A | 5/1994 | Balch et al. | 368/9 |
| 5,337,233 A | 8/1994 | Hofert et al. | 715/540 |
| 5,341,293 A | 8/1994 | Vertelney et al. | 715/530 |
| 5,351,190 A | 9/1994 | Kondo | 704/8 |
| 5,386,564 A | 1/1995 | Shearer et al. | 395/650 |
| 5,392,386 A | 2/1995 | Chalas | 715/841 |
| 5,418,902 A | 5/1995 | West et al. | 715/503 |
| 5,446,891 A | 8/1995 | Kaplan et al. | 707/2 |
| 5,522,089 A | 5/1996 | Kikinis et al. | 710/73 |
| 5,535,323 A | 7/1996 | Miller et al. | 715/707 |
| 5,541,836 A | 7/1996 | Church et al. | 704/7 |
| 5,546,521 A | 8/1996 | Martinez | 715/711 |
| 5,581,684 A | 12/1996 | Dudzik et al. | 715/708 |
| 5,596,700 A | 1/1997 | Darnell et al. | 715/512 |
| 5,617,565 A | 4/1997 | Augenbraun et al. | 707/4 |
| 5,625,783 A | 4/1997 | Ezekiel et al. | 395/352 |
| 5,627,567 A | 5/1997 | Davidson | 345/173 |
| 5,627,958 A | 5/1997 | Potts et al. | 715/708 |
| 5,629,846 A | 5/1997 | Crapo | 395/785 |
| 5,634,019 A | 5/1997 | Koppolu et al. | 715/744 |
| 5,640,560 A | 6/1997 | Smith | 707/104.1 |
| 5,657,259 A | 8/1997 | Davis et al. | 708/204 |
| 5,685,000 A | 11/1997 | Cox | 704/9 |
| 5,708,825 A | 1/1998 | Sotomayor | 715/501.1 |
| 5,715,415 A | 2/1998 | Dazey et al. | 715/708 |
| 5,717,923 A | 2/1998 | Dedrick | 707/102 |
| 5,752,022 A | 5/1998 | Chiu et al. | 707/10 |
| 5,761,689 A | 6/1998 | Rayson et al. | 707/533 |
| 5,764,794 A | 6/1998 | Perlin | 382/186 |
| 5,765,156 A | 6/1998 | Guzak et al. | 707/100 |
| 5,781,189 A | 7/1998 | Holleran et al. | 715/826 |
| 5,781,904 A | 7/1998 | Oren et al. | 707/100 |
| 5,794,257 A | 8/1998 | Liu et al. | 715/501.1 |
| 5,799,068 A | 8/1998 | Kikinis et al. | 379/93.06 |
| 5,802,253 A | 9/1998 | Gross et al. | 395/51 |
| 5,802,262 A | 9/1998 | Van De Vanter | 714/1 |
| 5,802,299 A | 9/1998 | Logan et al. | 709/218 |
| 5,802,530 A | 9/1998 | Van Hoff | 715/513 |
| 5,805,911 A | 9/1998 | Miller | 715/534 |
| 5,809,318 A | 9/1998 | Rivette et al. | 715/512 |
| 5,815,830 A | 9/1998 | Anthony | 707/6 |
| 5,818,447 A | 10/1998 | Wolf et al. | 715/752 |
| 5,821,931 A | 10/1998 | Berquist et al. | 715/784 |
| 5,822,539 A | 10/1998 | van Hoff | 709/236 |
| 5,822,720 A | 10/1998 | Bookman et al. | 704/3 |
| 5,826,025 A | 10/1998 | Gramlich | 709/217 |
| 5,832,100 A | 11/1998 | Lawton et al. | 382/100 |
| 5,845,077 A | 12/1998 | Fawcett | 709/221 |
| 5,845,278 A | 12/1998 | Kirsch et al. | 707/3 |
| 5,848,386 A | 12/1998 | Motoyama | 704/5 |
| 5,855,007 A | 12/1998 | Jovicic et al. | 705/14 |
| 5,859,636 A | 1/1999 | Pandit | 715/501.1 |
| 5,872,973 A | 2/1999 | Mitchell et al. | 395/685 |
| 5,875,443 A | 2/1999 | Nielsen | 707/2 |
| 5,877,757 A | 3/1999 | Baldwin et al. | 715/705 |
| 5,884,266 A | 3/1999 | Dvorak | 704/270.1 |
| 5,892,919 A | 4/1999 | Nielsen | 395/200.58 |
| 5,893,073 A | 4/1999 | Kasso et al. | 705/8 |
| 5,893,132 A | 4/1999 | Huffman et al. | 715/201 |
| 5,895,461 A | 4/1999 | De La Huerga et al. | 707/1 |
| 5,896,321 A | 4/1999 | Miller et al. | 365/189.01 |
| 5,900,004 A | 5/1999 | Gipson | 707/530 |
| 5,907,852 A | 5/1999 | Yamada | 715/541 |
| 5,913,214 A | 6/1999 | Madnick et al. | 707/10 |
| 5,920,859 A | 7/1999 | Li | 707/5 |
| 5,924,099 A | 7/1999 | Guzak et al. | 707/100 |
| 5,933,139 A | 8/1999 | Feigner et al. | 715/708 |
| 5,933,140 A | 8/1999 | Strahorn et al. | 715/712 |
| 5,933,498 A | 8/1999 | Schneck et al. | 705/54 |
| 5,940,614 A | 8/1999 | Allen et al. | 717/120 |
| 5,944,787 A | 8/1999 | Zoken | 709/206 |
| 5,946,647 A | 8/1999 | Miller et al. | 704/9 |
| 5,948,061 A | 9/1999 | Merriman et al. | 709/219 |
| 5,956,681 A | 9/1999 | Yamakita | 704/260 |
| 5,974,409 A | 10/1999 | Sanu et al. | 707/3 |
| 5,974,413 A | 10/1999 | Beauregard et al. | 707/6 |
| 5,978,754 A | 11/1999 | Kumano | 704/3 |
| 5,983,216 A | 11/1999 | Kirsch et al. | 707/2 |
| 5,983,218 A | 11/1999 | Syeda-Mahmood | 707/3 |
| 5,987,402 A | 11/1999 | Murata et al. | 704/2 |
| 5,987,480 A | 11/1999 | Donohue et al. | 715/501.1 |
| 5,991,719 A | 11/1999 | Yazaki et al. | 704/251 |
| 5,995,756 A | 11/1999 | Hermann | 395/712 |
| 6,006,265 A | 12/1999 | Rangan et al. | 709/226 |
| 6,006,279 A | 12/1999 | Hayes | 719/328 |
| 6,014,616 A | 1/2000 | Kim | 704/8 |
| 6,018,761 A | 1/2000 | Uomini | 706/206 |
| 6,026,388 A | 2/2000 | Liddy et al. | 704/4 |
| 6,028,605 A | 2/2000 | Conrad et al. | 345/840 |
| 6,029,135 A | 2/2000 | Krasle | 704/275 |
| 6,029,171 A | 2/2000 | Smiga et al. | 707/102 |
| 6,031,525 A | 2/2000 | Perlin | 345/173 |
| 6,052,531 A | 4/2000 | Waldin et al. | 717/170 |
| 6,061,516 A | 5/2000 | Yoshikawa et al. | 717/109 |
| 6,061,701 A | 5/2000 | Hirai et al. | 707/536 |
| 6,064,951 A | 5/2000 | Park et al. | 704/8 |
| 6,067,087 A | 5/2000 | Krauss et al. | 715/762 |
| 6,072,475 A | 6/2000 | Van Ketwich | 345/173 |
| 6,073,090 A | 6/2000 | Fortune et al. | 704/8 |
| 6,085,201 A | 7/2000 | Tso | 715/505 |
| 6,088,711 A | 7/2000 | Fein et al. | 715/523 |
| 6,092,074 A | 7/2000 | Rodkin et al. | 707/102 |
| 6,102,969 A | 8/2000 | Christianson et al. | 707/3 |
| 6,108,640 A | 8/2000 | Slotznick | 705/26 |
| 6,108,674 A | 8/2000 | Murakami et al. | 715/515 |
| 6,112,209 A | 8/2000 | Gusack | 707/101 |
| 6,121,968 A | 9/2000 | Arcuri et al. | 345/352 |
| 6,122,647 A | 9/2000 | Horowitz et al. | 715/513 |
| 6,126,306 A | 10/2000 | Ando | 708/605 |
| 6,137,911 A | 10/2000 | Zhilyaev | 382/225 |
| 6,141,005 A | 10/2000 | Hetherington et al. | 715/866 |
| 6,151,643 A | 11/2000 | Cheng et al. | 710/36 |
| 6,154,738 A | 11/2000 | Call | 707/4 |
| 6,167,469 A | 12/2000 | Safai et al. | 710/62 |
| 6,167,523 A | 12/2000 | Strong | 726/21 |
| 6,167,568 A | 12/2000 | Gandel et al. | 717/176 |
| 6,173,316 B1 | 1/2001 | De Boor et al. | 709/218 |
| 6,182,029 B1 | 1/2001 | Friedman | 704/9 |
| 6,185,550 B1 | 2/2001 | Snow et al. | 707/1 |
| 6,185,576 B1 | 2/2001 | McIntosh | 707/200 |
| 6,199,046 B1 | 3/2001 | Heinzle et al. | 705/1 |
| 6,199,081 B1 | 3/2001 | Meyerzon et al. | 715/513 |
| 6,208,338 B1 | 3/2001 | Fischer et al. | 715/705 |
| 6,219,698 B1 | 4/2001 | Iannucci et al. | 709/221 |
| 6,246,404 B1 | 6/2001 | Feigner et al. | 715/708 |
| 6,262,728 B1 | 7/2001 | Alexander | 345/440.1 |
| 6,272,074 B1 | 8/2001 | Winner | 368/10 |
| 6,272,505 B1 | 8/2001 | De La Huerga | 707/501 |
| 6,282,489 B1 | 8/2001 | Bellesfield et al. | 701/201 |
| 6,282,537 B1 * | 8/2001 | Madnick et al. | 707/4 |
| 6,291,785 B1 | 9/2001 | Koga et al. | 209/584 |
| 6,292,768 B1 | 9/2001 | Chan | 704/1 |
| 6,295,061 B1 | 9/2001 | Park et al. | 715/764 |
| 6,297,822 B1 | 10/2001 | Feldman | 715/705 |
| 6,300,950 B1 | 10/2001 | Clark et al. | 715/705 |

| Patent | Date | Inventor | Class |
|---|---|---|---|
| 6,308,171 B1 | 10/2001 | De La Huerga | 707/3 |
| 6,311,152 B1 | 10/2001 | Bai et al. | 704/9 |
| 6,311,177 B1 | 10/2001 | Dauerer et al. | 707/2 |
| 6,311,194 B1 | 10/2001 | Sheth et al. | 715/505 |
| 6,320,496 B1 | 11/2001 | Sokoler et al. | 340/470.1 |
| 6,323,853 B1 | 11/2001 | Hedloy | 345/339 |
| 6,336,125 B2 | 1/2002 | Noda et al. | 715/531 |
| 6,336,131 B1 | 1/2002 | Wolfe | 709/203 |
| 6,338,059 B1 | 1/2002 | Fields et al. | 707/4 |
| 6,339,436 B1 | 1/2002 | Amro et al. | 715/714 |
| 6,339,755 B1 | 1/2002 | Hetherington et al. | 704/8 |
| 6,347,398 B1 | 2/2002 | Parthasarathy et al. | 717/170 |
| 6,349,295 B1 | 2/2002 | Tedesco et al. | 707/3 |
| 6,353,926 B1 | 3/2002 | Parthesarathy et al. | 717/11 |
| 6,381,742 B2 | 4/2002 | Forbes et al. | 717/176 |
| 6,382,350 B1 | 5/2002 | Jezewski et al. | 181/290 |
| 6,392,668 B1 | 5/2002 | Murray | 715/38 |
| 6,396,515 B1 | 5/2002 | Hetherington et al. | 715/762 |
| 6,401,067 B2 | 6/2002 | Lewis et al. | 704/275 |
| 6,408,323 B1 | 6/2002 | Kobayashi et al. | 709/100 |
| 6,413,100 B1 | 7/2002 | Dickmeyer et al. | 434/322 |
| 6,415,304 B1 | 7/2002 | Horvitz | 715/205 |
| 6,421,678 B2 | 7/2002 | Smiga et al. | 707/102 |
| 6,424,979 B1 | 7/2002 | Livingston et al. | 715/511 |
| 6,434,567 B1 | 8/2002 | De La Huerga | 707/102 |
| 6,438,545 B1 | 8/2002 | Beauregard et al. | 707/6 |
| 6,441,753 B1 | 8/2002 | Montgomery | 341/34 |
| 6,442,545 B1 | 8/2002 | Feldman et al. | 707/8 |
| 6,442,591 B1 | 8/2002 | Haynes et al. | 709/206 |
| 6,456,304 B1 | 9/2002 | Anguilo et al. | 715/779 |
| 6,470,091 B2 | 10/2002 | Koga et al. | 382/101 |
| 6,473,069 B1 | 10/2002 | Gerpheide | 345/157 |
| 6,477,510 B1 | 11/2002 | Johnson | 705/30 |
| 6,480,860 B1 | 11/2002 | Monday | 707/102 |
| 6,493,006 B1 | 12/2002 | Gourdol et al. | 345/825 |
| 6,498,982 B2 | 12/2002 | Bellesfield et al. | 701/202 |
| 6,507,839 B1 | 1/2003 | Ponte | 707/3 |
| 6,510,504 B2 | 1/2003 | Satyanarayanan | 711/170 |
| 6,516,321 B1 | 2/2003 | De La Huerga | 707/102 |
| 6,519,557 B1 | 2/2003 | Emens et al. | 704/8 |
| 6,519,603 B1 | 2/2003 | Bays et al. | 707/102 |
| 6,529,899 B1* | 3/2003 | Kraft et al. | 707/3 |
| 6,546,433 B1 | 4/2003 | Matheson | 709/318 |
| 6,553,385 B2 | 4/2003 | Johnson et al. | 707/104.1 |
| 6,556,972 B1 | 4/2003 | Bakis et al. | 704/277 |
| 6,556,984 B1 | 4/2003 | Zien | 707/2 |
| 6,564,264 B1 | 5/2003 | Creswell et al. | 709/245 |
| 6,571,241 B1 | 5/2003 | Nosohara | 707/6 |
| 6,571,253 B1 | 5/2003 | Thompson et al. | 707/103 R |
| 6,601,075 B1* | 7/2003 | Huang et al. | 707/104.1 |
| 6,615,131 B1 | 9/2003 | Rennard et al. | 701/200 |
| 6,618,733 B1 | 9/2003 | White et al. | 707/103 |
| 6,622,140 B1 | 9/2003 | Kantrowitz | 707/5 |
| 6,623,527 B1 | 9/2003 | Hamzy | 715/513 |
| 6,625,581 B1 | 9/2003 | Perkowski | 705/27 |
| 6,629,079 B1 | 9/2003 | Spiegel et al. | 705/26 |
| 6,629,092 B1* | 9/2003 | Berke | 707/3 |
| 6,631,519 B1 | 10/2003 | Nicholson et al. | 717/169 |
| 6,636,880 B1 | 10/2003 | Bera | 708/206 |
| 6,654,932 B1 | 11/2003 | Bahrs et al. | 715/507 |
| 6,658,623 B1 | 12/2003 | Schilit et al. | 715/513 |
| 6,687,485 B2 | 2/2004 | Hopkins et al. | 434/350 |
| 6,694,307 B2 | 2/2004 | Julien | 707/3 |
| 6,697,824 B1 | 2/2004 | Bowman-Amuah | 709/229 |
| 6,697,837 B1 | 2/2004 | Rodov | 709/203 |
| 6,708,189 B1 | 3/2004 | Fitzsimons et al. | 707/205 |
| 6,715,144 B2 | 3/2004 | Daynes et al. | 717/174 |
| 6,717,593 B1 | 4/2004 | Jennings | 715/760 |
| 6,718,516 B1 | 4/2004 | Claussen et al. | 715/513 |
| 6,724,403 B1 | 4/2004 | Santoro et al. | 345/765 |
| 6,728,679 B1 | 4/2004 | Strubbe et al. | 704/270.1 |
| 6,732,090 B2 | 5/2004 | Shanahan et al. | 707/3 |
| 6,732,361 B1 | 5/2004 | Andreoli et al. | 719/313 |
| 6,741,994 B1 | 5/2004 | Kang et al. | 707/102 |
| 6,742,054 B1 | 5/2004 | Upton | 710/6 |
| 6,745,177 B2 | 6/2004 | Kepler et al. | 707/3 |
| 6,745,178 B1 | 6/2004 | Emens et al. | 707/3 |
| 6,745,208 B2 | 6/2004 | Berg et al. | 707/201 |
| 6,795,808 B1 | 9/2004 | Strubbe et al. | 704/275 |
| 6,802,061 B1 | 10/2004 | Parthasarathy et al. | 717/173 |
| 6,826,726 B2 | 11/2004 | Hsing et al. | 715/513 |
| 6,829,631 B1 | 12/2004 | Forman et al. | 708/202 |
| 6,845,499 B2 | 1/2005 | Srivastava et al. | 717/100 |
| 6,857,103 B1 | 2/2005 | Wason | 715/709 |
| 6,859,908 B1 | 2/2005 | Clapper | 715/224 |
| 6,868,525 B1 | 3/2005 | Szabo | 715/738 |
| 6,874,125 B1 | 3/2005 | Carroll et al. | 715/705 |
| 6,874,143 B1 | 3/2005 | Murray et al. | 717/173 |
| 6,880,129 B1 | 4/2005 | Lee et al. | 715/763 |
| 6,883,137 B1 | 4/2005 | Girardot et al. | 715/513 |
| 6,889,260 B1* | 5/2005 | Hughes | 709/246 |
| 6,901,402 B1 | 5/2005 | Corston-Oliver et al. | 701/101 |
| 6,901,403 B1* | 5/2005 | Bata et al. | 707/101 |
| 6,904,560 B1 | 6/2005 | Panda | 715/202 |
| 6,925,457 B2 | 8/2005 | Britton et al. | 707/1 |
| 6,925,470 B1 | 8/2005 | Sangudi et al. | 707/102 |
| 6,934,702 B2 | 8/2005 | Faybishenko et al. | 707/3 |
| 6,944,857 B1 | 9/2005 | Glaser et al. | 717/173 |
| 6,948,133 B2 | 9/2005 | Haley | 715/780 |
| 6,950,821 B2 | 9/2005 | Faybishenko et al. | 707/10 |
| 6,950,831 B2 | 9/2005 | Haley | 707/104.1 |
| 6,950,982 B1 | 9/2005 | Dourish | 715/512 |
| 6,957,385 B2 | 10/2005 | Chan et al. | 715/504 |
| 6,963,867 B2 | 11/2005 | Ford et al. | 707/3 |
| 6,964,010 B1 | 11/2005 | Sharp | 715/507 |
| 6,964,053 B2* | 11/2005 | Ho et al. | 719/319 |
| 6,968,346 B2 | 11/2005 | Hekmatpour | 707/104.1 |
| 6,975,983 B1 | 12/2005 | Fortescue et al. | 704/9 |
| 6,976,090 B2 | 12/2005 | Ben-Shaul et al. | 709/246 |
| 6,976,209 B1 | 12/2005 | Storisteanu et al. | 715/512 |
| 6,981,212 B1 | 12/2005 | Claussen et al. | 715/205 |
| 6,986,104 B2 | 1/2006 | Green et al. | 715/523 |
| 6,990,654 B2 | 1/2006 | Carroll | 717/109 |
| 7,003,522 B1 | 2/2006 | Reynar et al. | 707/10 |
| 7,003,560 B1 | 2/2006 | Mullen et al. | 709/223 |
| 7,013,289 B2 | 3/2006 | Horn et al. | 705/26 |
| 7,013,303 B2* | 3/2006 | Faybishenko et al. | 707/10 |
| 7,017,046 B2* | 3/2006 | Doyle et al. | 713/178 |
| 7,017,175 B2* | 3/2006 | Alao et al. | 725/105 |
| 7,028,312 B1 | 4/2006 | Merrick et al. | 719/330 |
| 7,032,174 B2 | 4/2006 | Montero et al. | 715/533 |
| 7,051,076 B2 | 5/2006 | Tsuchiya | 709/206 |
| 7,072,886 B2 | 7/2006 | Salmenkaita et al. | 707/3 |
| 7,073,133 B2 | 7/2006 | Hughes et al. | 715/765 |
| 7,082,392 B1 | 7/2006 | Butler et al. | 704/233 |
| 7,100,115 B1 | 8/2006 | Yennaco | 715/748 |
| 7,111,077 B1* | 9/2006 | Starkovich et al. | 709/246 |
| 7,113,976 B2 | 9/2006 | Watanabe | 709/206 |
| 7,171,415 B2 | 1/2007 | Kan et al. | 707/10 |
| 7,209,915 B1 | 4/2007 | Taboada et al. | 707/3 |
| 7,216,351 B1 | 5/2007 | Maes | 719/328 |
| 7,237,190 B2 | 6/2007 | Rollins et al. | 707/513 |
| 7,281,245 B2 | 10/2007 | Reynar et al. | 717/173 |
| 7,325,194 B2 | 1/2008 | Moore et al. | 715/530 |
| 7,356,537 B2 | 4/2008 | Reynar et al. | 707/100 |
| 7,356,615 B2 | 4/2008 | Cai et al. | 709/246 |
| 7,392,479 B2 | 6/2008 | Jones et al. | 715/513 |
| 7,421,645 B2 | 9/2008 | Reynar | 715/206 |
| 7,475,390 B2 | 1/2009 | Berstis et al. | 717/136 |
| 2001/0016880 A1 | 8/2001 | Cai et al. | 709/321 |
| 2001/0029605 A1 | 10/2001 | Forbes et al. | 717/170 |
| 2001/0041328 A1 | 11/2001 | Fisher | 434/157 |
| 2001/0042098 A1 | 11/2001 | Gupta et al. | 709/206 |
| 2001/0049676 A1 | 12/2001 | Kepler et al. | 707/3 |
| 2001/0056461 A1 | 12/2001 | Kampe et al. | 709/201 |
| 2002/0002590 A1 | 1/2002 | King et al. | 709/206 |

| | | | | | | |
|---|---|---|---|---|---|---|
| 2002/0003469 A1 | 1/2002 | Gupta ................... 340/407.1 | | 2003/0220795 A1 | 11/2003 | Araysantiparb et al. ...... 704/275 |
| 2002/0003898 A1 | 1/2002 | Wu ............................ 382/187 | | 2003/0229913 A1 | 11/2003 | Doganata et al. ................ 707/3 |
| 2002/0004803 A1 | 1/2002 | Serebrennikov ............. 715/513 | | 2003/0229593 A1 | 12/2003 | Raley et al. .................. 705/55 |
| 2002/0023113 A1 | 2/2002 | Hsing et al. ................ 707/513 | | 2003/0233330 A1 | 12/2003 | Raley et al. .................. 705/55 |
| 2002/0023136 A1 | 2/2002 | Silver et al. ................ 709/206 | | 2003/0237049 A1 | 12/2003 | Sawicki et al. ............. 715/513 |
| 2002/0026450 A1 | 2/2002 | Kuramochi ............. 707/104.1 | | 2004/0001099 A1 | 1/2004 | Reynar et al. ............... 345/776 |
| 2002/0029304 A1 | 3/2002 | Reynar et al. ............... 719/332 | | 2004/0003389 A1 | 1/2004 | Reynar et al. ............... 717/178 |
| 2002/0032775 A1 | 3/2002 | Venkataramaiah et al. .. 709/225 | | 2004/0006564 A1 | 1/2004 | Lucovsky et al. ............. 707/10 |
| 2002/0035581 A1 | 3/2002 | Reynar et al. ............... 715/513 | | 2004/0006741 A1 | 1/2004 | Radja et al. ................ 715/513 |
| 2002/0038180 A1 | 3/2002 | Bellesfield et al. .......... 701/202 | | 2004/0039990 A1 | 2/2004 | Bakar et al. ................ 715/505 |
| 2002/0065110 A1 | 5/2002 | Enns et al. .................. 455/566 | | 2004/0133846 A1 | 7/2004 | Khoshatefeh et al. ....... 715/500 |
| 2002/0065891 A1 | 5/2002 | Malik ........................ 709/206 | | 2004/0162833 A1 | 8/2004 | Jones et al. ................ 707/100 |
| 2002/0066073 A1 | 5/2002 | Lienhard et al. ............. 717/105 | | 2004/0165007 A1 | 8/2004 | Shafron ...................... 345/781 |
| 2002/0078222 A1 | 6/2002 | Compas et al. ............. 709/232 | | 2004/0172584 A1 | 9/2004 | Jones et al. ................ 715/500 |
| 2002/0087591 A1 | 7/2002 | Reynar et al. ............... 707/500 | | 2004/0199861 A1 | 10/2004 | Lucovsky ................. 715/500 |
| 2002/0091803 A1 | 7/2002 | Imamura et al. ............ 709/220 | | 2004/0201867 A1 | 10/2004 | Katano ..................... 358/1.15 |
| 2002/0100036 A1 | 7/2002 | Moshir et al. ............... 717/173 | | 2004/0230666 A1 | 11/2004 | Taboada et al. ............. 709/217 |
| 2002/0103794 A1* | 8/2002 | Chang ............................ 707/3 | | 2004/0236717 A1 | 11/2004 | Demartini et al. .............. 707/1 |
| 2002/0103829 A1 | 8/2002 | Manning et al. ............. 715/513 | | 2004/0243575 A1* | 12/2004 | Ohashi ........................... 707/3 |
| 2002/0104080 A1 | 8/2002 | Woodard et al. ............. 717/176 | | 2004/0268237 A1 | 12/2004 | Jones et al. ................ 715/513 |
| 2002/0107735 A1 | 8/2002 | Henkin et al. ................. 705/14 | | 2005/0050164 A1 | 3/2005 | Burd et al. .................. 709/217 |
| 2002/0110225 A1 | 8/2002 | Cullis ......................... 379/67.1 | | 2005/0055330 A1 | 3/2005 | Britton et al. ................... 707/1 |
| 2002/0120685 A1 | 8/2002 | Srivastava et al. ........... 709/203 | | 2005/0094850 A1 | 5/2005 | Nakao ....................... 382/103 |
| 2002/0129107 A1 | 9/2002 | Lunghran et al. ............ 709/206 | | 2005/0108195 A1 | 5/2005 | Yalovsky et al. ............... 707/1 |
| 2002/0133523 A1 | 9/2002 | Ambler et al. .............. 707/536 | | 2005/0120313 A1 | 6/2005 | Rudd et al. ................. 715/866 |
| 2002/0149601 A1 | 10/2002 | Rajarajan et al. ............ 345/619 | | 2005/0155017 A1 | 7/2005 | Berstis et al. ................ 717/114 |
| 2002/0156774 A1 | 10/2002 | Beauregard et al. ............ 707/3 | | 2005/0182617 A1 | 8/2005 | Reynar et al. ................... 704/4 |
| 2002/0156792 A1 | 10/2002 | Gombocz et al. ........... 707/100 | | 2005/0187926 A1 | 8/2005 | Britton et al. ................... 707/3 |
| 2002/0156929 A1 | 10/2002 | Hekmatpour ................ 709/310 | | 2005/0278309 A1 | 12/2005 | Evans et al. .................... 707/3 |
| 2002/0169802 A1 | 11/2002 | Brewer et al. ................. 707/513 | | 2006/0101005 A1 | 5/2006 | Yang et al. ..................... 707/3 |
| 2002/0175955 A1 | 11/2002 | Gourdol et al. ............. 715/703 | | 2006/0173764 A1 | 8/2006 | Nakajima et al. ............... 704/9 |
| 2002/0178008 A1 | 11/2002 | Reynar ....................... 704/272 | | 2007/0005702 A1 | 1/2007 | Tokuda et al. ............... 709/206 |
| 2002/0178182 A1 | 11/2002 | Wang et al. .............. 715/501.1 | | 2007/0073652 A1 | 3/2007 | Taboada et al. .................. 707/3 |
| 2002/0184247 A1 | 12/2002 | Jokela et al. ................ 707/204 | | 2007/0136261 A1 | 6/2007 | Taboada et al. .................. 707/3 |
| 2002/0188941 A1 | 12/2002 | Cicciarelli et al. ........... 717/175 | | 2008/0021886 A1 | 1/2008 | Wang-Aryattanwanich | |
| 2002/0196281 A1 | 12/2002 | Audleman et al. .......... 715/762 | | | | et al. ............................ 707/3 |
| 2002/0198909 A1 | 12/2002 | Huynh et al. .................. 707/3 | | 2008/0046812 A1 | 2/2008 | Reynar et al. ............... 715/234 |
| 2003/0002391 A1 | 1/2003 | Biggs ........................... 368/82 | | | | |
| 2003/0004937 A1 | 1/2003 | Salmenkaita et al. ........... 707/3 | | | FOREIGN PATENT DOCUMENTS | |
| 2003/0005411 A1 | 1/2003 | Gerken ....................... 717/120 | | | | |
| 2003/0009489 A1 | 1/2003 | Griffin ....................... 707/500 | | EP | 0481784 A2 | 4/1992 |
| 2003/0014745 A1 | 1/2003 | Mah et al. .................. 717/170 | | EP | 0598511 A2 | 5/1994 |
| 2003/0025728 A1 | 2/2003 | Ebbo et al. .................. 715/744 | | EP | 0872827 A2 | 10/1998 |
| 2003/0030672 A1 | 2/2003 | Hughes et al. ............... 345/765 | | EP | 0810520 B1 | 12/1998 |
| 2003/0046316 A1 | 3/2003 | Gergie et al. ................ 707/513 | | EP | 1093058 A1 | 4/2001 |
| 2003/0050924 A1 | 3/2003 | Faybishenko et al. .......... 707/3 | | EP | 1280068 A2 | 1/2003 |
| 2003/0051236 A1 | 3/2003 | Pace et al. ................... 717/177 | | EP | 1361523 A2 | 11/2003 |
| 2003/0055818 A1 | 3/2003 | Faybishenko et al. .......... 707/3 | | EP | 1376392 A2 | 1/2004 |
| 2003/0056207 A1 | 3/2003 | Fischer et al. ............... 717/174 | | EP | 1447754 A1 | 8/2004 |
| 2003/0081791 A1 | 5/2003 | Erickson et al. ............. 380/282 | | JP | 64-0088771 A | 4/1989 |
| 2003/0083910 A1 | 5/2003 | Sayal et al. ..................... 705/7 | | JP | 05-174013 | 7/1993 |
| 2003/0084138 A1 | 5/2003 | Tavis et al. .................. 709/223 | | JP | 08-272662 | 10/1996 |
| 2003/0088544 A1 | 5/2003 | Kan et al. ....................... 707/3 | | JP | 09-138636 | 5/1997 |
| 2003/0097318 A1 | 5/2003 | Yu et al. ........................ 705/35 | | JP | 2000-222394 | 8/2000 |
| 2003/0101204 A1 | 5/2003 | Watson ....................... 708/206 | | JP | 2000-231566 | 8/2000 |
| 2003/0101416 A1 | 5/2003 | McInnes et al. ............. 715/513 | | JP | 2001-014303 | 1/2001 |
| 2003/0105806 A1* | 6/2003 | Gayle et al. ................. 709/203 | | JP | 2001-125994 | 5/2001 |
| 2003/0106040 A1 | 6/2003 | Rubin et al. ................. 717/106 | | JP | 2001-522112 | 11/2001 |
| 2003/0115039 A1 | 6/2003 | Wang .............................. 704/4 | | JP | 2002-041353 | 2/2002 |
| 2003/0121033 A1 | 6/2003 | Peev et al. ................... 717/175 | | JP | 2002163250 A | 6/2002 |
| 2003/0126120 A1 | 7/2003 | Faybishenko et al. .......... 707/3 | | JP | 2002-222181 | 8/2002 |
| 2003/0126136 A1 | 7/2003 | Omoigui ....................... 707/10 | | WO | WO 95/07510 A1 | 3/1995 |
| 2003/0140308 A1 | 7/2003 | Murthy et al. ............... 715/500 | | WO | WO 99/17240 A1 | 4/1999 |
| 2003/0154144 A1 | 8/2003 | Pokomy et al. ................ 705/28 | | WO | WO 00/54174 A1 | 9/2000 |
| 2003/0158841 A1 | 8/2003 | Britton et al. ................... 707/3 | | WO | WO 00/67117 A2 | 11/2000 |
| 2003/0158851 A1 | 8/2003 | Britton et al. ................ 707/100 | | WO | WO 00/73949 A1 | 12/2000 |
| 2003/0172343 A1 | 9/2003 | Leymaster et al. ........... 715/500 | | WO | WO 01/18687 A1 | 3/2001 |
| 2003/0176995 A1 | 9/2003 | Sukehiro ........................ 704/7 | | WO | WO 01/37170 A2 | 5/2001 |
| 2003/0182258 A1* | 9/2003 | Sakamoto et al. ............... 707/1 | | WO | WO 01/186390 A2 | 11/2001 |
| 2003/0182391 A1 | 9/2003 | Leber et al. ................. 709/217 | | WO | WO 02/099627 A1 | 1/2002 |
| 2003/0192040 A1 | 10/2003 | Vaughan ..................... 717/173 | | WO | WO 02/15518 A2 | 2/2002 |
| 2003/0195871 A1 | 10/2003 | Luo et al. ........................ 707/3 | | WO | WO 02/42928 A1 | 5/2002 |
| 2003/0195937 A1 | 10/2003 | Kircher et al. ............... 709/207 | | | | |

WO WO 2004/012099 A2 2/2004

OTHER PUBLICATIONS

U.S. Appl. No. 09/750,940, filed Dec. 29, 2000, entitled "Pluggable Service Delivery Platform."
U.S. Appl. No. 09/840,421, filed Apr. 23, 2001, entitled "XML-Based System and Method for Collaborative Web-Based Design and Verification of System-on-a-Chip."
Santos, C.A.S., L.F.G Soares, G.L. de Souza and J.P. Courtiat; *Design methodology and formal validation of hypermedia documents*; Proceedings of the sixth ACM international conference on multimedia, (1998) p. 39-48.
Terveen, Loren, Will Hill and Brian Amento; *Constructing, organizing, and visualizing collections of tropically related Web resources*; ACM Trans. Comput.-um. Interact. 6, 1 (Mar. 1999) p. 67-94.
Barrett, Rob, Paul P. Maglio and Daniel C. Kellem: *How to personalize the Web*; Conference proceedings on human factors in computing systems (1997) p. 75-82.
Marx, Matthew and Chris Schmandt; *CLUES: dynamic personalized message filtering*; Proceedings of the ACM 1996 conference on computer supported cooperative work (1996) p. 113-121.
Goschka, Karl M. and Jurgen Falb; *Dynamic hyperlink generation for navigation in relational databases*; Proceedings of the tenth ACM conference on hypertext and hypermedia: returning to our diverse roots (1999) p. 23-24.
Pentland, Alex; *Perceptual user interfaces: perceptual intelligence*; Commun. ACM 43, 3 (Mar. 2002) p. 35-44.
Stairmand, Mark A.; *Textual context analysis for information retrieval*; Proceedings of the 20th annual international ACM SIGIR conference on research and development in information retrieval (1997) p. 140-147.
Glushko, Robert J., Jay M. Tenenbaum and Bart Meltzer; *An XML framework for agent-based E-commerce*; Commun. ACM 42, 3 (Mar. 1999) p. 106.
Kukich, Karen; *Techniques for Automatically Correcting Words in Text*; ACM Comput. Surv., 24, 4 (Dec. 1992); pp. 377-439.
Marx, Matt and Chris Schmandt; *Putting People First: Specifying Proper Names in Speech Interfaces*; Proceedings of the ACM Symposium on User Interface Software and Technology; 1994; pp. 29-37.
Ford, Bryan, Mike Hibler, Jay Lepreau, Roland McGrath and Patrick Tullman; *Interface and execution models in the fluke kernel*; Proceedings of the third symposium on operating systems design and implementation, (1999) p. 101-115.
Desmarais, Michel C. and Jiming Liu; *Exploring the applications of user-expertise assessment for intelligent interfaces*; Proceedings of the conference on human factors in computing systems, (1993) p. 308-313.
Foley, James D.; *Future directions in user-computer interface software*; Conference proceedings on organizational computer systems, (1991) p. 289-297.
Hartson, H. Rex and Deborah Hix; *Human-computer interface development: corcepts and systems for its management*; ACM Comput. Surv. 1 (Mar. 1989) p. 5-92.
Foley, Jim; *Integrating computer technology, people technology and application technology; strategies and case studies from Georgia Tech's Graphics, Visualization and Usability Center*, Proceedings of the workshop on advanced visual interfaces, (1994) p. 34-43.
Tsai, M., P. Reiher and G.J. Popek; *Command management system for next-generation user input*; Proceedings of the seventh workshop on hottopics in operating systems, (1999) p. 179-84.
Panagiotis, Christias, Man-cgi 1.15, http://www.physics.umn.edu/cgi-bin/man-cgi?spell, 1994, 5 pp.
Bischof, Hans-Peter, "Spell, Spellin, Spellout—Finding Spelling Errors", http://www.vorlesungen.uni-osnabrueck.de/informatik/shellscript/Html/Man/_Man_NeXT_html/html..., Apr. 21, 1997, 2 pp.
Panagiotis, Christias, Man-cgi 1.15, http://www.calpoly.edu/cgi-bin/man-cgi?spell+1, 1994, 3 pp.
Martensson, Bengt, "Thread-Enhanced Spell Front End for GNU Emacs + Detext + Delatex", http://www.geocrawler.com/archives/3/337/1987/8/0/1871981/, Aug. 20, 1987, 1 page.

Willisson, Pace, Ispell (1), http://www.rt.com/man/findaffix.1.html, 1983, 15 pp.
Willisson, Pace, Ispell (1), "User Commands", http://www.csee.usf.edu/cgi-bin/man-cgi?ispell, 1983, 18 pp.
McMahon, Lee. E., "SED—A Non-Interactive Text Editor," Bell Laboratories, Murray Hill, New Jersey 07974, Aug. 15, 1978, pp. 16.
IBM Corporation, IBM Research Disclosure #368; "Multimedia Hyperlinks Automatically Created For Reference Documents," *IBM Technical Disclosure* Bulletin, Jun. 1993, pp. 1-5.
*The Complete LINUX™ Operating System 5.2 Deluxe*, Red Hat, ® Macmillian Digital Publishing USA, A Viacom Company, Red Hat Software, Inc., ISBN 1-57595-199-1B, 1995-1998, pp. 1-385.
*User Manual For AddressMate and AddressMate Plus*, CoStar Corporation, AddressMate Software, 1994-1995, pp. 1-210.
*Getting Results With Microsoft® Office 97, Real World Solutions For The Work You Do*, Microsoft Corporation, 1995-1997, pp. 1-703.
*InfoCentral™ 7*, User's Manual, Corel Corporation, vol. 1, Version 7.0, 1996, pp. 1-86.
Novell GroupWise User'Guide for Windows 16-Bit Version 5.2, Novell, Inc., 1993-1997, pp. 1-231.
Novell GroupWise User's Guide for Windows 32-Bit Version 5.2, Novell, Inc., 1998, pp. 1-318.
Claris Em@iler Getting Started User's Guide, For Macintosh, Claris Corporation, 1995-1997, 61 pp.
Developer's Guide to Apple Data Detectors, For Version 1.0.2., Apple Computer, Inc., 1997, pp. 1-33.
Apple Data Detectors User's Manual, Apple Computer, Inc., 1997, pp. 1-15.
Nardi, Bonnie A.; Miller, James R.; Wright, David J., "Collaborative, Programmable Intelligent Agents," Jim Miller/Miramontes Computing, Apple Computer Advanced Technology Group, http://www.miramontes.com/writing/add-cacm/add-cacm/html, Mar. 1998, pp. 1-11.
Hewkin, "Smart Tags-the Distributed-Memory Revolution", IEE Review, Jun. 22, 1989, pp. 203-206.
Measuring Units Conversion Table—http://web.archie.org- 1997 Internet French Property, pp. 1-4.
IBM Technical Disclosure Bulletin, "National Language Support Enablemetn for Culture-Specific Operations", Nov. 1, 1993, vol. 36, Issue 11, pp. 629-638.
Towers, J. Tarin, Visual Quickstart Guide: Dreamweaver 2 for Windows and Macintosh, 1999, Peachpit Press, pp. 150-151.
Driza, Scott, "Learn Word 2000 VBA Document Automation", Wordware Publishing Inc., 2001, 6 pp.
Cornell, Paul, "Developing Smart Tag DLLs", MSDN Library, http://msdn.microsft.com/library/default/asp?url=/library/en-us/dnsmart-tag/html/odc_smarttags.asp, Apr. 2001, pp. 8.
Menu Customizing, IBM Technical Disclosure Bulletin, vol. 34, No. 1, Jun. 1991, pp. 91-92 (4 pp. total).
Perry, Brad, et al., "Discovering Similar Resources by Content Part-Linking", Proceedings of the Sixth International Conference on Information and Knowledge Management, published by ACM Press 1997, pp. 317-324.
Schulz, Charles, "Writing Applications for Uniform Operations on a Mainframe or PC: A Metric Conversion Program", Lockheed Missles & Space Company, Inc., Sunnyvale, CA, May 1990, pp. 348-361.
Devanbue, P. et al., "Chime: customizable hyperlink insertion and maintenance engine for software engineering environments", Software Engineering, Publication date: 1999, ISBN: 1-58113-07400.
"Using Flyswat", http://www.flywsat.com/using/html, download date: Sep. 28, 1999, 1 pp.
"What is Flyswat", http://www.flyswat.com, download date: Sep. 28, 1999, 5 pp.
"Intelligent Text Processing: About", http://www.syntalex.co.uk/about/about.html, download date: Aug. 7, 1999, 1 pp.
"Intelligent Text Processing: Automatic Cross-Referencing", http://www.syntalex.co.uk/services/acrl.html, download date: Aug. 7, 1999, 3 pp.
"Intelligent Text Processing: Case Study: Context", http://www.syntalex.co.uk/casestudies/context.html, download date: Aug. 7, 1999, 3 pp.
"Integrating with External Systems: iPlanet® Unified Development Server", Sun Microsystems, Inc., Ver. 5.0, Aug. 2001, pp. 127-156.

Sperberg-McQueen, C.M. and Thompson, Henry, "XML Schema", W3C Architecture Domain, http://web.archive.org/web/20020802155904/http://www.w3.org/XML/Schema, 2000-2002, pp. 1-10.

Quin, Liam, "Extensible Markup Language (XML)", W3C Architecture Domain, http://web.archive.org/web/2002121962057/http://www.w3.org/XML/, 1996-2002, pp. 1-3.

Clark, James, and DeRose, Steve, "XML Path Language (XPath), Version 1.0", W3C, http://web.archive.org/web/2021010034434/http://www.w3.org/TR/xpath, 1999-2000, pp. 1-31.

"Microsoft BizTalk Server 2002—Using BizTalk Mapper", http://msdn.Microsoft.com/library/en-us/bts_2002/htm/lat_xmltools_map_intro_zkqb.asp . . . , Microsoft Corporation, 1999-2001, pp. 1-2.

"BizTalk Server 2002 Mapper User Interface", http://msdn.microsoft.com/library/en-us/bts_2002/htm/lat_xmltools_map_concept_codw..., Microsoft Corporation, 1999-2001, pp. 1.

"BizTalk Server 2002 Compiling Maps", http://msdn.microsoft.com/library/en-us/bts_2002/htm/lat_xmltools_map_concept_drgl.a..., Microsoft Corporation, 1999-2001, pp. 1.

"BizTalk Server 2002 Testing Maps", http://msdn.microsoft.com/library/en-us/bts_2002/htm/lat_xmltools_map_concept_fhhy.a..., Microsoft Corporation, 1999-2001, pp. 1-2.

"BizTalk Server 2002 View Links and Functoids By Using Grid Preview", http://msdn.microsoft.com/library/en-us/bts_2002/htm/lat_xmltools_map_check_fuwn.as..., Microsoft Corporation, 1999-2001, pp. 1.

"The StarOffice® 6.0 Suite: New Features Guide", Sun Microsystems, v. 1.1, Jul. 2002, pp. 1-31.

"New Microsoft office Family Application Taps Power of Industry-Standard XML", http://www.microsoft.com/presspass/press/2002/oct02/10-09officefamilypr.mspx, Microsoft Corporation, Oct. 2002-Feb. 2003, pp. 1-2.

"Q&A: How 'XDocs' Alters the Paradigm for Gathering Business-Critical Information", http://www.microsoft.com/presspass/2002/oct02/10-09officefamily.mspx, Microsoft Corporation, Oct. 2002-Feb. 2003, pp. 1-4.

"InfoPath: Microsoft Names New Product from Office Group", http://www.microsoft.com/presspass/press/2003/feb03/02-10infopath.mspx, Microsoft Corporation, Oct. 2002-Feb. 2003, pp. 1-4.

"Microsoft Unveils Visual Studio.NET Enterprise Tools", Microsoft Corporation, http://microsoft.com/presspass/2001/may01/05-21vseepr.mspx, May 2001, pp. 1-4.

"Microsoft Extends XML Web Services Support in .NET Enterprise Servers Through Visual Studio .NET", http://www.microsoft.com/presspass/press/2002/feb02/02-13servervspr.mspx, Microsoft Corporation, Feb. 2002, pp. 1-3.

"How to Use XSL to Transform Excel XML Spreadsheet for Server-Side Use", http://support.microsoft.com/default.aspx?scid=kb;en-us;278976, Microsoft Corporation, Aug. 2004, pp. 1-7.

Mueller, Jennifer M, "Work Smarter with Smart Tags", Journal of Accounting—Online, vol. 194, No. 5, Nov. 2002, http://www.aicpa.org/pubs/jofa/nov2002/Mueller.htm>, retrieved on Apr. 22, 2005.

Fernandez M. et al., "SilkRoute: trading between relations and XML", Computer Networks, vol. 33, No. 1-6, Jun. 2000, pp. 723-745.

Braganholo V., "Updating Relational Databases Through XML Views", Technical Report, Sep. 2002, pp. 1-61.

Falquet G. et al., "Design and Analysis of Active Hypertext Views on Databases", Information Sciences Institute, Jan. 2002, pp. 1-24.

Ceri S. et al., "Deriving Production Rules for Incremental View Maintenance", Proceedings of the 17th International Conference on Very Large Data Bases, Sep. 1991, pp. 577-589.

Bonifati A., "Active Behaviors within XML Document Management", EDBT Ph. D. Workshop, Mar. 2000, pp. 1-4.

"Integrated Development Environment (IDE)", http://web.archive.org/web/20020602032242/http:altova.com/products_ide.html, Jun. 2002, pp. 1-2.

"Altova markup your mind!" http://web.archive.org/web/20021204211721/http://altova.com/products_ide.html, Dec. 2002, pp. 1-3.

Arbortext, "Arbortext and Accessibility", http://web.archive.org/web/20021219133536/www.arbortext.com/html/accessibility.html, Dec. 2002, pp. 1-5.

Arbortext, "XML Compliance, 100% Pure XML", http:web.archive.org/web/20021209185855/www.arbortext.com/html/xml_compliance, Dec. 2002, pp. 1-3.

Arbortext, "Schemas", http://web.archive.org/web/20021221023148/www.arbortext.com/html/schemas.html, Dec. 2002, pp. 1-3.

Arbortext, "Arbortext's Support for XSL-FO", http://web.archive.org/web/20021221021632/www.arbortext.com/html/xsl-fo.html. Dec. 2002, pp. 1-4.

Corel, "Corel XMetal4, Making XML Content Creation Easy", http://web.archive.org/web/20031118215158/www.corel.com/servlet/Satellite?pagename, Nov. 2003, pp. 1-2.

Corel, "Corel XMetal 4 and Interwoven TeamXML", http://web.archive.org/web/20030807211225/www.corel.com/futuretense_cs/ccurl/corel+xml+4+and+interwoven+teamxml.pdf, Aug. 2003, pp. 1-2.

Corel, "The Corel-XyEnterprise XML Solution", http://web.archive.org/web/20030807154355/www.corel.com/futuretense_cs/ccurl/corel+and+XY+enterprise+XML+solution.pdf, Aug. 2003, pp. 1-2.

Brooks-Bilson, "Programming ColdFusion" [electronic resource] 2001, Safari Tech Books Online, 1st Edition, 25 pp.

Wilker, John, "ColdFusion MX Adds J2EE, XML, and Web Services Compatibility", Aug. 9, 2002, http://builder.com.com/5102-6387-104585.html, 3 pp.

Homer, Alex et al., Professional Active Services Pages, 1997, Wrox Press Ltd., Section"Client-Side Scripting and Components", subsection "Choosing Your Applets, and Controls", 16 pp.

Flanagan, D., "JavaScript—The Definitive Guide, Fourth Edition", Jan. 2002, O'Reilly, 12 pp.

Brockschmidt, K., "Inside OLE, Second Edition", 1995, Microsoft Press, p. 169.

Toth, V., "Visual C++ 4 Unleashed", 1996, Sams Publishing, p. 174.

Sriram, V., "ComponentXchange: An E-Exchange for Software Components", Master Thesis, CitSeer, May 2001, pp. i-v, 1-77.

Bosak, "XML: The Universal Publishing Format", SGML/XML Europe '98, May 1998, pp. A1-C17.

Kristensen, "Template Resolution in XML/HTML", Computer Networks and ISDN Systems, vol. 30, 1998, pp. 239-249.

Fan et al., "FormPlus: A Form Authoring Toolkit", Proceedings of the Fourteenth Annual Computer Software'and Applications Conference, Oct. 31, 1990-Nov. 2, 1990, pp. 255-260.

Boone, "Concept Features in Re: Agent, An Intelligent Email Agent", Proceedings of the 2nd International Conference on Autonomous Agents, May 9-13, 1998, pp. 141-148.

Takkinen et al., "Café: A Conceptual Model for Managing Information in Electronic Mail", Proceedings of the Annual Hawaii International Conference on System Sciences, 1998, pp. 44-53.

"Smart Tags: Dumb Technology?", webreference.com, Online, Aug. 29, 2001, http://www.webreference.com/xml/column30/3.html, 3 pp.

"Being 'Smart' with Smart Tags in Office XP", Create for Mississippi, Aug. 2001, http://www.create.celt.msstate.edu/create/howto/smart_tags.pdf, 7 pp.

Harold, E.R., "XML: Extensible Markup Language", IDG Books Worldwide, Books 24x7.com printout, 1998, 20 pp.

Marais, Hannes, "Supporting Cooperative and Personal Surfing With a Desktop Assistant", 1997, ACM Press, pp. 129-138.

World Wide Web Consortium, "Document Object Model (DOM) Level 2 Events Specification, Version 1.0", http://www.w3.org/TR/2000/REC-DOM-Level-2-Events-20001113/DOM2-Events.pdf, Nov. 2000, 50 pp.

World Wide Web Consortium, "Document Object Model (DOM) Level 2 Core Specification, Version 1.0", http;//www.w3.org/TR/2000/REC-DOM-Level-2-Core-20001113/DOM2-Core.pdf, Nov. 2000, 107 pp.

"Word 2002 Add in: measurement Converter Smart Tag", http://www.microsoft.com/downloads/details.aspx?FamilyID=f67fc42c-5f41-4c3f-9d5a-71354471dc32&DisplayLang=en, retrieved on Nov. 9, 2006, 2 pp.

"Microsoft Measurement Converter Smart Tag—Chinese Version", http://www.jiyang.gov/cn/laiying/My%20Pictures/%E8%B4%E5%BA%86%E8%BE%89/office2003/FILES/PFILES/COMMON/MSSHARED/SMARTTAG/CMEASURE/1033/CHMCABT.HTM, retrieved on Nov. 7, 2006, 2 pp.

Anonymous, "Adding Data from Other Sources in PowerPoint 2002," Jul. 2002, Internet article, XP-002420700, A Professional Approach Series the E-Zine Approach, http://www.glencoe.com/ps/computered/pas/article.php4?articleId-437, 8 pgs.

Rice, F.C., "Transform XML'Files with XSLT When Importing into Microsoft Excel 2002," Jul. 2001, Internet article, XP-002420701, http://msdn2.microsoft.com/en-us/library/aa140055(office,10,d=printer).aspx, 9 pgs.

Johnson, L., "What's So Special About Paste Special?", Jun. 2002, Internet article, XP-002420702, http://pubs.logicalexpressions.com/Pub0009/I.PMArticle.asp?ID=40, 5 pgs.

Anonymous, "Moving and Copying Text Tutorial," Aug. 17, 2001, Internet Article, XP-002307566, http://tutorials.findtutorials.com/read/category/102/id/342/p/3, 4 pgs.

Blaheta et al., "Assigning Function Tags to Parsed Text," Morgan Kaufmann Publishers Inc., 2000, pp. 234-240.

Pershikov, V.I., "Explanatory Dictionary in Informatics", Finances and Statistics, Moscow, 1991 (In Russian with translated sections), 5 pp.

Rubin, C., "Microsoft Word 2000 Official Manual", First Edition, Nikkei BP Soft Press, Inc., Aug. 2, 1999, pp. 215-217.

Lewis et al., "A Sequential Algorithm for Training Text Classifiers", Spring-Verlag New York, Inc., 1994, pp. 1-10.

Wei, Ying-bin et al., "A New Technology ColdFusion of realizing Dynamic Webpage", Computer and Modernization, 2000, 6 pp. (English language translation).

Doroth, V., "Modern Computer Vocabulary", St. Petersburg, BHV-Peterburg, 2001, p. 456 (in Russian).

Pixley, "Document Object Model (DOM) Level 2 Events Specification Version 1.0", World Wide Web Consortium, Nov. 13, 2000, www.w3.org/TR/2000/REC-DOM-Level-2-Events-20001113/DOM2-Events.pdf.

Stowe, M., "XML in Excel and the Spreadsheet Component", Microsoft Corporation, Aug. 2001, 6 pp.

Heinemann, C., "Cross-Reference your XML Data", Microsoft Corporation, Dec. 7, 1998, 6 pp.

Obasanjo, D., "XML_Namespaces and How They Affect Xpath and XSLT", Microsoft Corporation, May 20, 2002, 19 pp.

"XML Schema Part 2: Datatypes", WC3, http://www.w3.org/TR/2001/REC-xmlschema-2-0010502/, May 2, 2001, pp. 1-146.

U.S. Appl. No. 11/396,937, filed Apr. 3, 2006, entitled "Automatically Adding Proper Names to a Database" Abandoned.

U.S. Appl. No. 09/588,411, filed Jun. 6, 2000, entitled "Method and System for Semantically Labeling Strings and Providing Actions Based on Semantically Labeled Strings".

U.S. Appl. No. 10/141,712, filed May 9, 2002, entitled "Method, System, and Apparatus for Converting Dates Between Calendars and Languages Based Upon Semantically Labeled Strings".

U.S. Appl. No. 10/154,630, filed May 23, 2002, entitled "Method, System, and Apparatus for Converting Numbers Based Upon Semantically Labeled Strings".

U.S. Appl. No. 10/731,899, filed Dec. 9, 2003, entitled "Mechanism for Downloading Components Associated with XML Documents and Smart Documents".

U.S. Appl. No. 10/179,810, filed Jun. 25, 2002 entitled "Method, System, and Apparatus for Performing Custom Actions on Digital Content".

U.S. Appl. No. 10/179,438, filed Jun. 25, 2002, entitled "Method and System for Dynamically Providing Actions Associated with Semantically Labeled Strings".

U.S. Appl. No. 10/426,446, filed Apr. 29, 2003, entitled "Methods and System for Recognizing Names in a Computer-Generated Document and for Providing Helpful Actions Associated with Recognized Names".

U.S. Official Action dated Dec. 29, 2003 in U.S. Appl. No. 09/588,411.
U.S. Official Action dated Feb. 12, 2004 in U.S. Appl. No. 10/154,630.
U.S. Official Action dated Mar. 29, 2004 in U.S. Appl. No. 09/906,552.
U.S. Official Action dated Jun. 14, 2004 in U.S. Appl. No. 09/588,411.
U.S. Official Action dated Jun. 18, 2004 in U.S. Appl. No. 09/818,157.
U.S. Official Action dated Jul. 15, 2004 in U.S. Appl. No. 09/903,467.
U.S. Official Action dated Aug. 20, 2004 in U.S. Appl. No. 09/841,266.
U.S. Official Action dated Sep. 29, 2004 in U.S. Appl. No. 09/907,418.
U.S. Official Action dated Oct. 6, 2004 in U.S. Appl. No. 09/818,157.
U.S. Official Action dated Nov. 2, 2004 in U.S. Appl. No. 10/178,680.
U.S. Official Action dated Dec. 8, 2004 in U.S. Appl. No. 09/588,411.
U.S. Official Action dated Jan. 25, 2005 in U.S. Appl. No. 09/906,552.
U.S. Official Action dated Jan. 26, 2005 in U.S. Appl. No. 10/154,630.
U.S. Official Action dated Mar. 1, 2005 in U.S. Appl. No. 09/818,157.
U.S. Official Action dated Mar. 17, 2005 in U.S. Appl. No. 09/841,265.
U.S. Official Action dated Mar. 24, 2005 in U.S. Appl. No. 10/141,712.
U.S. Official Action dated Apr. 8, 2005 in U.S. Appl. No. 10/164,960.
U.S. Official Action dated Apr. 19, 2005 in U.S. Appl. No. 09/841,266.
U.S. Official Action dated May 5, 2005 in U.S. Appl. No. 09/906,467.
U.S. Official Action dated May 6, 2005 in U.S. Appl. No. 09/907,418.
U.S. Official Action dated May 20, 2005 in U.S. Appl. No. 10/184,298.
U.S. Official Action dated Jun. 3, 2005 in U.S. Appl. No. 10/154,630.
U.S. Official Action dated Jun. 6, 2005 in U.S. Appl. No. 10/164,260.
U.S. Official Action dated Jun. 24, 2005 in U.S. Appl. No. 10/140,544.
U.S. Official Action dated Jul. 25, 2005 in U.S. Appl. No. 10/179,438.
U.S. Official Action dated Sep. 2, 2005 in U.S. Appl. No. 10/366,141.
U.S. Official Action dated Oct. 4, 2005 in U.S. Appl. No. 10/183,317.
U.S. Official Action dated Oct. 5, 2005 in U.S. Appl. No. 10/179,810.
U.S. Official Action dated Oct. 20, 2005 in U.S. Appl. No. 09/906,552.
U.S. Official Action dated Nov. 2, 2005 in U.S. Appl. No. 10/184,190.
U.S. Official Action dated Nov. 10, 2005 in U.S. Appl. No. 10/164,260.
U.S. Official Action dated Nov. 15, 2005 in U.S. Appl. No. 09/841,265.
U.S. Official Action dated Nov. 22, 2005 in U.S. Appl. No. 10/141,712.
U.S. Official Action dated Dec. 5, 2005 in U.S. Appl. No. 09/907,418.
U.S. Official Action dated Dec. 14, 2005 in U.S. Appl. No. 10/608,267.
U.S. Official Action dated Dec. 15, 2005 in U.S. Appl. No. 10/155,680.
U.S. Official Action dated Jan. 11, 2006 in U.S. Appl. No. 09/841,266.
U.S. Official Action dated Jan. 17, 2006 in U.S. Appl. No. 10/140,544.
U.S. Official Action dated Feb. 2, 2006 in U.S. Appl. No. 09/906,467.
U.S. Official Action dated Feb. 16, 2006 in U.S. Appl. No. 10/184,298.
U.S. Official Action dated Feb. 24, 2006 in U.S. Appl. No. 10/154,630.
U.S. Official Action dated Apr. 5, 2006 in U.S. Appl. No. 10/377,258.
U.S. Official Action dated Apr. 10, 2006 in U.S. Appl. No. 10/179,810.
U.S. Official Action dated Apr. 17, 2006 in U.S. Appl. No. 10/179,438.
U.S. Official Action dated Apr. 17, 2006 in U.S. Appl. No. 10/184,190.

U.S. Official Action dated May 26, 2006 in U.S. Appl. No. 09/588,411.
U.S. Official Action dated May 31, 2006 in U.S. Appl. No. 10/141,712.
U.S. Official Action dated Jun. 1, 2006 in U.S. Appl. No. 10/366,141.
U.S. Official Action dated Jul. 19, 2006 in U.S. Appl. No. 09/906,552.
U.S. Official Action dated Aug. 2, 2006 in U.S. Appl. No. 10/731,899.
U.S. Official Action dated Aug. 9, 2006 in U.S. Appl. No. 10/164,960.
U.S. Official Action dated Aug. 18, 2006 in U.S. Appl. No. 09/907,418.
U.S. Official Action dated Sep. 7, 2006 in U.S. Appl. No. 10/155,680.
U.S. Official Action dated Sep. 28, 2006 in U.S. Appl. No. 10/608,267.
U.S. Official Action dated Oct. 5, 2006 in U.S. Appl. No. 09/841,266.
U.S. Official Action dated Oct. 6, 2006 in U.S. Appl. No. 10/140,544.
U.S. Official Action dated Oct. 10, 2006 in U.S. Appl. No. 09/841,265.
U.S. Official Action dated Oct. 19, 2006 in U.S. Appl. No. 09/906,467.
U.S. Official Action dated Nov. 9, 2006 in U.S. Appl. No. 10/184,298.
U.S. Official Action dated Nov. 15, 2006 in U.S. Appl. No. 10/179,438.
U.S. Official Action dated Dec. 20, 2006 in U.S. Appl. No. 10/154,630.
U.S. Official Action dated Dec. 26, 2006 in U.S. Appl. No. 10/179,810.
U.S. Official Action dated Jan. 5, 2007 in U.S. Appl. No. 10/183,717.
U.S. Official Action dated Jan. 11, 2007 in U.S. Appl. No. 10/184,190.
U.S. Official Action dated Jan. 25, 2007 in U.S. Appl. No. 10/608,267.
U.S. Official Action dated Feb. 6, 2007 in U.S. Appl. No. 09/588,411.
U.S. Official Action dated Feb. 7, 2007 in U.S. Appl. No. 10/179,438.
U.S. Official Action dated Feb. 21, 2007 in U.S. Appl. No. 10/366,141.
U.S. Official Action dated Mar. 9, 2007 in U.S. Appl. No. 10/426,446.
U.S. Official Action dated Mar. 12, 2007 in U.S. Appl. No. 10/141,712.
U.S. Official Action dated Apr. 10, 2007 in U.S. Appl. No. 09/907,418.
U.S. Official Action dated May 14, 2007 in U.S. Appl. No. 09/906,552.
U.S. Official Action dated May 18, 2007 in U.S. Appl. No. 10/155,680.
U.S. Official Action dated May 30, 2007 in U.S. Appl. No. 09/906,467.
U.S. Official Action dated Jun. 15, 2007 in U.S. Appl. No. 10/731,899.
U.S. Official Action dated Jun 28, 2007 in U.S. Appl. No. 09/841,266.
U.S. Official Action dated Jul. 12, 2007 in U.S. Appl. No. 10/184,298.
U.S. Official Action dated Jul. 13, 2007 in U.S. Appl. No. 10/154,630.
U.S. Official Action dated Jul. 20, 2007 in U.S. Appl. No. 09/841,265.
U.S. Official Action dated Jul. 26, 2007 in U.S. Appl. No. 10/165,960.
U.S. Official Action dated Aug. 10, 2007 in U.S. Appl. No. 10/179,810.
U.S. Official Action dated Sep. 27, 2007 in U.S. Appl. No. 10/608,267.
U.S. Official Action mailed Oct. 9, 2007 in U.S. Appl. No. 10/183,317.
U.S. Official Action mailed Oct. 16, 2007 in U.S. Appl. No. 09/907,418.
U.S. Official Action mailed Oct. 17, 2007 in U.S. Appl. No. 10/155,680.
U.S. Official Action mailed Oct. 19, 2007 in U.S. Appl. No. 10/141,712.
U.S. Official Action mailed Oct. 19, 2007 in U.S. Appl. No. 09/588,411.
U.S. Official Action mailed Oct. 19, 2007 in U.S. Appl. No. 10/184,190.
U.S. Official Action mailed Oct. 30, 2007 in U.S. Appl. No. 09/906,552.
U.S. Official Action mailed Dec. 7, 2007 in U.S. Appl. No. 10/426,446.
U.S. Official Action mailed Dec. 18, 2007 in U.S. Appl. No. 10/366,141.
U.S. Official Action mailed Dec. 26, 2007 in U.S. Appl. No. 10/377,258.
U.S. Official Action mailed Dec. 26, 2007 in U.S. Appl. No. 09/841,265.
U.S. Official Action mailed Jan. 7, 2008 in U.S. Appl. No. 10/179,438.
U.S. Official Action mailed Jan. 9, 2008 in U.S. Appl. No. 09/906,467.
U.S. Official Action mailed Jan. 25, 2008 in U.S. Appl. No. 10/608,267.
U.S. Official Action mailed Feb. 8, 2008 in U.S. Appl. No. 10/141,712.
U.S. Official Action mailed Feb. 15, 2008 in U.S. Appl. No. 10/731,899.
U.S. Official Action mailed Feb. 20, 2008 in U.S. Appl. No. 10/154,630.
U.S. Official Action mailed Apr. 1, 2008 in U.S. Appl. No. 09/907,418.
U.S. Official Action mailed Apr. 4, 2008 in U.S. Appl. No. 10/155,680.
U.S. Official Action mailed Apr. 29, 2008 in U.S. Appl. No. 09/588,411.
U.S. Official Action mailed Apr. 29, 2008 in U.S. Appl. No. 10/179,810.
U.S. Official Action mailed May 1, 2008 in U.S. Appl. No. 10/183,317.
U.S. Official Action mailed May 27, 2008 in U.S. Appl. 09/906,552.
U.S. Examiner's Answer BPA1 mailed Jun. 5, 2008 in U.S. Appl. No. 10/184,298.
U.S. Official Action mailed Jun. 11, 2008 in U.S. Appl. No. 09/841,265.
U.S. Official Action mailed Jun. 27, 2008 in U.S. Appl. No. 10/377,258.
U.S. Official Action mailed Jun. 12, 2008 in U.S. Appl. No. 10/426,446.
U.S. Official Action mailed Jun. 13, 2008 in U.S. Appl. No. 10/780,376.
U.S. Official Action mailed Jul. 29, 2008 in U.S. Appl. No. 10/141,712.
U.S. Official Action mailed Aug. 1, 2008 in U.S. Appl. No. 11/234,968.
European Communication dated Apr. 19, 2006 in EP 05 000 506.5-1527.
European Communication dated Sep. 25, 2006 in EP 03 01 4181.
European Communication dated Nov. 9, 2006 in EP 03 01 0292.5-1527.
European Communication dated Nov. 17, 2006 in EP 03 011 851.7-2211.
European Communication dated Dec. 11, 2006 in EP 03 012 830.0-2211.
European Communication dated Feb. 19, 2007 in EP 04 003 683.2-2211.
European Communication dated Sep. 25, 2007 in EP 03 014 181.6-1243.
European Examination Report dated Mar. 4, 2008 in EP 02 014 717.9.
European Examination Report dated Mar. 4, 2008 in EP 03 012 432.5.
European Communication Summons to Attend Oral Proceedings dated Mar. 4, 2008 in EP 05 000 506.5-1527.
European Communication Summons to Attend Oral Proceedings dated Mar. 10, 2008 in EP 03 01 0292.5-1527.
European Communication Summons to Attend Oral Proceedings dated May 7, 2008 in EP 04002224.6.
European Communication dated Jun. 3, 2008 in EP 03 011 851.7-2211.
Singapore Search Report/Written Opinion dated Jan. 26, 2007 in SG 200500214-2.
Singapore Examination Report (conducted by Austrian Patent Office) dated Jan. 25, 2008 in SG 200500214-2.
Malaysian Search Report dated Aug. 2, 2007 in PI 20040265.

Russian Official Action dated Oct. 11, 2007 in 2003118722.
Russian Official Action dated Jan. 11, 2008 in 2004105880.
Russian Official Action dated Mar. 13, 2008 in 2004104096.
Japanese Official Action dated Oct. 19, 2007 in 2003-128417.
Japanese Official Action dated Mar. 28, 2008 in 2003-178497.
Japanese Official Action dated Apr. 18, 2008 in 2003-128417.
Chinese Official Action dated Dec. 28, 2007 in 200410005390.8.
Chinese Official Action dated Jan. 4, 2008 in 200510008487.0.
"The Spatial Smart Tag", Geomatic Technologies, Mar. 10, 2005, 2 pp.
Harmon, D., "Microsoft MapPoint 2002", Geoworld Quick-Take Reviews, Aug. 2001, 3 pp.
Irie R. et al., "Resources for Place Name Analysis", May 28, 2004, 4 pp.
Rajabifard, A. et al., "Creating an Enabling Platform for the Delivery of Spatial Information", Spatial Sciences Institute Biennial Conference, Sep. 12, 2005, 10 pp.
Camarda, B., Special Editing Using® Microsoft® Office Word 2003, Que, Dec. 12, 2003, pp. 1-5.
Ivens, K., Office XP Smart Tags, Microsoft, Mar. 6, 2002, pp. 1-4.
Frye, C., Microsoft Office Systems: Step by Step, Microsoft Press, 2003 Edition, Sep. 3, 2003, pp. 1-6.
U.S. Official Action mailed Sep. 8, 2006 in U.S. Appl. No. 10/948,948.
U.S. Official Action mailed Feb. 15, 2007 in U.S. Appl. No. 10/948,948.
U.S. Official Action mailed Oct. 18, 2007 in U.S. Appl. No. 10/948,948.
U.S. Official Action mailed Mar. 20, 2008 in U.S. Appl. No. 10/948,948.
U.S. Official Action mailed Oct. 16, 2008 in U.S. Appl. No. 10/948,948.
U.S. Official Action mailed Oct. 16, 2008 in U.S. Appl. No. 10/154,630.
European Search Report dated Dec. 12, 2006 in European Application No. 05 105 000.3-1527.
European Examination Report dated Oct. 9, 2007 in European Application No. 05 105 000.3-1527.
European Preliminary Opinion dated Aug. 27, 2008 cited in European Application No. 04002224.6-1527 / 1447754.
Chinese Official Action dated Dec. 7, 2007 in Chinese Application No. 200510088529.4.
Chinese Second Official Action dated Aug. 15, 2008 in Chinese Application No. 200510088529.4.
Chilean Second Office Action cited in Chilean Application No. 67-2005 (date unknown).
Malaysian Official Action dated Aug. 29, 2008 cited in Malaysian Application No. PI 20031902.
Polish Official Action dated Aug. 27, 2008 in Polish Application No. P360520.
European Communications Minutes of Oral Proceedings and Decision dated Sep. 15, 2008 in European Application No. 05 000 506.5-1527.
Polish Second Official Action dated Oct. 28, 2008 in Polish Application No. P36553.
Japanese Office Action dated Oct. 10, 2008 cited in Application No. 2004-037158.
Koyaku, H., "What is Brought to SQL Server 2000 by XML, Part 1: Function of XML Provided by SQL Server 2000", Enterprise Servers World, vol. 3, No. 12, IDG Japan, Inc., Dec. 1, 2000, pp. 42-53.
Chinese Office Action dated Oct. 17, 2008 cited in Application No. 03145242.6.
U.S. Final Office Action dated Sep. 3, 2008 cited in U.S. Appl. No. 11/678,412.
U.S. Final Office Action dated Dec. 8, 2008 cited in U.S. Appl. No. 10/183,317.
Office Action for U.S. Appl. No. 10/179,810, dated Dec. 23, 2008.
Sharon Oviatt et al.; "Integration and Synchronization of Input Modes during Multimodal Human-Computer Interaction," CHI 97, Atlanta, GA, Mar. 22-27, 1997, pp. 412-422.
Hara, T., et al.; "Inside Microsoft.NET-Complete Explanation, 'What Microsoft Aims For'"; msdn magazine, No. 6, pp. 20-35, ASCII, Japan, Sep. 18, 2000, 19 pp.

Babylon-Pro, http://web.archive.org/web/20021204203634/www3.babylon.com/display.php?id=14&tre . . . , Dec. 4, 2002, 4 pages.
Dong-Guk Shin and Lung-Yung Chu, *Establishing Logical Connectivity between Query Keywords and Database Contents, Advances in Artificial Intelligence*, 12th Biennial Conference of the Canadian Society for Computational Studies of Intelligence, AI'98, Vancouver, BC, Canada, Jun. 18-20, 1998, Proceedings, p. 45-59.
GuruNet Press-Articles, http://web.archive.org/web/20030619163926/gurunet.com/buzz_articles.html, Jun. 19, 2003, 5 pages.
Ho-Chuan Huang, Jon Kerridge, and Shang-Liang Chen, *A Query Mediation Approach to Interoperability of Heterogeneous Databases, Australian Computer Science Communications*, vol. 22, No. 2, (1999), p. 41-48.
IEEE 100 The Authoritative Dictionary of IEEE Standards Terms, 2000, IEEE Press, 7th Edition, p. 795.
InteractiveTran™ Interactive Machine Translation, "Interactive Translation and Learning Tool," Date: Mar. 1, 2007, pp. 1-7, http://www.tranexp.com/win/InteractiveTran.htm.
Jaap C. Hage, Maarten van der Meulen, and Georges Span, *Intelligent Information Retrieval from Multiple Databases, Informatica e Diritto*, vol. 2, No. 2, (1993), p. 149-164.
Michael Halvorson et al., Microsoft Office XP Inside Out, Microsoft Press, 2001, 37 pages.
Microsoft Press Computer Dictionary, 1997, Microsoft Press, 3rd Edition, p. 355.
Multilingual Books, "Word Translator for Windows," Date: Mar. 1, 2007, pp. 1-4, http://www.multilingualbooks.com/wordtranslator.html.
Online Dictionary Software by Babylon, http://web.archive.org/web/20030122035306/http://www3.babylon.com/, Jan. 22, 2003, 2 pages.
Premium Content, http://web.archive.org/web/20031202172231/www.babylon.com/display.php?id=130&tre, Dec. 2, 2003, 2 pages.
Susan Gauch, Jianying Wang, and Satya Mahesh Rachakonda - University of Kansas, *A Corpus Analysis Approach for Automatic Query Expansion and Its extension to Multiple Databases, ACM Transactions on Information Systems*, vol. 17, No. 3, (Jul. 1999), p. 250-269.
Systran, "Systran Home Translator 2007 - The World's Best-Selling Language Translation Software," Date: 2007, pp. 1-2, www.systransoft.com/download/ProductDatasheets/Systran.Home.Translator.pdf.
TwinBridge Software Corporation, "TransWhiz English/Chinese Bi-directional Translation V9.0 Standard," Date: Mar. 1, 2007, pp. 1-8, http://www.twinbridge.com/detail.aspx?ID=132.
Why GuruNet, http://web.archive.org/web/20030602200950/http://www.gurunet.com/whygurunet.html, Jun. 2, 2003, 3 pages.
Yigal Arens, Chin Y. Chee, Chun-Nan Hsu and Craig A Knoblock, *Retrieving and Integrating Data from Multiple Information Sources, International Journal of Intelligent and Cooperative Information Systems*, vol. 2, No. 2, (1993), p. 127-158.
European Communication Minutes of Oral Proceedings and Decision dated Sep. 15, 2008 in European Application No. 05 000 506.5-1527.
U.S. Final Office Action dated Aug. 1, 2008 in U.S. Appl. No. 11/234,968.
U.S. Final Office Action dated Oct. 19, 2007 cited in U.S. Appl. No. 10/141,712.
U.S. Office Action dated Feb. 13, 2008 in U.S. Appl. No. 11/678,412.
U.S. Final Office Action dated Sep. 10, 2007 cited in U.S. Appl. No. 10/179,438.
U.S. Office Action dated Oct. 29, 2007 in U.S. Appl. No. 11/234,968.
U.S. Appl. No. 09/818,157, filed Mar. 27, 2001, entitled "Automatically Adding Proper Names to a Database.".
U.S. Appl. No. 09/841,265, filed Apr. 24, 2001, entitled "Method and System for Applying Input Mode Bias.".
U.S. Appl. No. 09/841,266, filed Apr. 24, 2001, entitled "Method and System for Providing Electronic Commerce Actions Based on Semantically Labeled Strings. ".
U.S. Appl. No. 09/906,467, filed Jul. 16, 2001, entitled "Application Program Interfaces for Semantically Labeling Strings and Providing Actions Based on Semantically Labeled Strings.".

U.S. Appl. No. 09/906,552, filed Jul. 16, 2001, entitled "Method and System for Providing Restricted Actions for Recognized Semantic Categories.".
U.S. Appl. No. 09/907,418, filed Jul. 17, 2001, entitled "Method and System for Defining Semantic Categories and Actions.".
U.S. Appl. No. 10/140,544, filed May 7, 2002, entitled "Method, System, and Apparatus for Converting Numbers Between Measurement Systems Based Upon Semantically Labeled Strings.".
U.S. Appl. No. 10/155,680, filed May 23, 2002, entitled "Method, System, and Apparatus for Converting Currency Values Based Upon Semantically Labeled Strings.".
U.S. Appl. No. 10/164,260 filed Jun. 5, 2002, entitled "Mechanism for Downloading Software Components from a Remote Source for Use by a Local Software Application.".
U.S. Appl. No. 10/164,960 filed Jun. 6, 2002, entitled "Providing Contextually Sensitive Actions and Help Content in Computer-Generated Documents.".
U.S. Appl. No. 10/178,680, filed Jun. 24, 2002, entitled "System and Method for Incorporating Smart Tags in Online Content.".
U.S. Appl. No. 10/183,317, filed Jun. 25, 2002, entitled "System and Method for Issuing a Message to a Program", Inventors: Sawicki et al.
U.S. Appl. No. 10/184,190 filed Jun. 27, 2002, entitled "System and Method for Providing Namespace Related Information".
U.S. Appl. No. 10/184,298, filed Jun. 27, 2002, entitled "Method and System for Associating Actions with Semantic Labels in Electronic Documents.".
U.S. Appl. No. 10/366,141 filed Feb. 13, 2003, entitled "Linking Elements of a Document to Corresponding Fields, Queries and/or Procedures in a Database".
U.S. Appl. No. 10/377,258 filed Feb. 28, 2003, entitled "Method and System for Enhancing Paste Functionality of a Computer Software Application".
U.S. Appl. No. 10/608,267 filed Jun. 27,2003, entitled "Leveraging Markup Language Data for Semantically Labeling Text Strings and Data and for Providing Actions Based on Semantically Labeled Text Strings and Data".
U.S. Appl. No. 10/780,376 filed Feb. 17, 2004, entitled "Methods and Systems for Providing Automatic Actions on Recognized Text Strings in a Computer-Generated Document".
U.S. Appl. No. 11/924,856 filed Oct. 26, 2007 entitled "Providing Contextually Sensitive Tools and Help Content in Computer-Generated Documents".
U.S. Office Action dated Feb. 3, 2009 in U.S. Appl. No. 11/234,968.
Australian First Examiner's Report dated Sep. 15, 2008 cited in Australian Application No. 2003204379.
European Communication dated Mar. 18, 2009 cited in European Application No. 04003683.2-2211.
European Summons to Attend Oral Proceedings dated Feb. 26, 2009 cited in European Application No. 0301283.0-2211.
European Summons to Attend Oral Proceedings dated Mar. 20, 2009 cited in European Application No. 03012830.0.
Japanese Final Official Action dated Nov. 25, 2008 cited in Japanese Application No. 2002-207514.
Japanese Official Action dated Feb. 13, 2009 cited in Japanese Application No. 2003-162911.
Japanese Official Action dated Feb. 24, 2009 cited in Japanese Application No. 2003-161338.
Japanese Official Action dated Feb. 6, 2009 cited in Japanese Application No. 2003-180218.
Japanese Official Action dated Mar. 6,2009 cited in Japanese Application No. 2004-042140.
Shiroiwa, K., "iMac&iBook, Must-see for User, Full of Recommended Setting Methods and Specially Selected Tips, Mastering Mac OS9", MacPeople, ASCII Corporation, Japan, Dec. 3, 1999, vol. 5, No. 24, p. 50 (in Japanese - no translation yet).
U.S. Final Office Action dated Jan. 22, 2009 cited in Application No. 10/366,141.
U.S. Final Office Action dated Mar. 4, 2009 cited in Application No. 10/780,376.
U.S. Office Action dated Feb. 4, 2009 cited in Application No. 10/377,258.
Mexican Official Action dated Feb. 11, 2009 cited in Application No. PA/a/2003/005451.
Chinese Final Rejection dated Mar. 13, 2009 cited in Application No. 03145242.6.
Japanese Final Rejection dated Mar. 17, 2090 cited in Application No. 2004-037158.
Japanese Final Rejection dated Apr. 3, 2009 cited in Application No. 2002-207514.
C. Goldfarb, XML Handbook, $1^{st}$ Ed., Pearson Education, Japan, May 10, 1999, pp. 246-254 (no English translation).
S. Tanaka, "Verifying the XML Schema Definition," XML Magazine, Shoeisha Co., Ltd., Vol. 10, No. 3, Jul. 1, 2000, pp. 135-155 (no English translation).
U.S. Office Action dated Apr. 20, 2009 cited in Application No. 10/426,446.
U.S. Office Action dated Apr. 27, 2009 cited in Application No. 10/154,630.

\* cited by examiner

METHOD, SYSTEM, AND COMPUTER-READABLE MEDIUM FOR COMMUNICATING RESULTS TO A DATA QUERY IN A COMPUTER NETWORK

TECHNICAL FIELD

The present invention relates generally to the communication of results to a query for data in a computer network. More particularly, the present invention relates to formatting a query for data utilizing a standard data format and communicating the results to the query in a format for presentation to a user in a graphical user interface in a computer network.

BACKGROUND OF THE INVENTION

Historically, computer systems and databases have contained data in incompatible formats. As the organizations utilizing these systems and databases became more automated and computerized, the need to share data over computer networks, such as the Internet, became more and more prevalent. Due to this need, standard formats for the sharing of data were developed.

One such standard format developed is Extensible Markup Language ("XML"). XML is a very hierarchical data format, which includes a multitude of data structures having parent-child relationships. Due to the advent of this standard data format, many computer users have converted the aforementioned databases to the standard XML data format. The XML format also allows computer users to tailor their data to specific documents using schemas. Schemas provide mechanisms to define and describe the structure, content, and to some extent semantics of XML documents. For example, a financial services company may have its own schema defining the structure and content its XML documents.

With the ease of availability of the personal computer, many users are utilizing computer networks to access research and reference information. For example, personal computer users may utilize a computer network to access financial information such as stock quotes or information typically found in reference books such as a dictionary or thesaurus by typing in a query into the computer. Currently, accessing such information is a multi-step process. For example, a user wishing to insert financial information in a word processing document would open a browser, retrieve the desired information, and copy and paste that information directly into the document. Furthermore, often these users find it desirable to receive results to a query for information in a "rich" data format for presentation to the user via a graphical user interface. For example, the results of a financial information query may include a graph showing changes in the price of a stock over the last thirty days. However, computer networks communicating using XML are unable to present "rich" data, as XML is a data exchange format.

It is with respect to these considerations and others that the present invention has been made.

SUMMARY OF THE INVENTION

In accordance with the present invention, the above and other problems are solved by a method and apparatus for formatting a query for data utilizing a standard data format and communicating the results to the query in a format for presentation to a user in a graphical user interface in a computer network.

In accordance with one aspect of the present invention, a method is provided for communicating results to a query for data in a computer network utilizing a graphical user interface resident on a client computer in the computer network. First, the query for data is received from the user interface. A graphical user interface on the client computer is utilized to generate the query. Then, a query packet is created containing the query for data. The query packet is created in accordance with a data format. Next, the query packet is sent to a remote computing device in the computer network. The remote computing device may be an information service provider. Next, a response packet adhering to the data format is received from the remote computing device. Then a determination is made as to whether the response packet contains a result to the data query. If the response packet contains a result to the data query the result is formatted for presentation to a user via the user interface on the local computing device. If the response packet does not contain a result to the data query, a status message indicating that no results were returned for the data query may be sent to the user interface. The data format utilized in the query and response packets may be Extensible Markup Language ("XML").

Prior to sending the query packet, the local computing device may be registered with the remote computing device in the computer network. To register the local computing device, a registration request is received from the user interface. Then a registration request packet containing the request is created in XML. Finally, the registration packet is sent to the remote computing device and a registration response packet containing a response to the registration request is received from the remote computing device.

In accordance with another aspect of the present invention, a system is provided for communicating results to a query for data in a computer network. The system includes user interface resident on a local computing device in the computer network for creating the query for data. The system further includes a framework, resident on the local computing device and in communication with the user interface. The framework is operative to receive the query for data from the user interface and create a query packet containing the query for data. The query packet is created in accordance with a data format which may be XML. The system further includes a remote computer in communication with the framework resident on the local computing device. The remote computer is operative to receive the query packet from the framework and send a response packet to the framework. The response packet is created in accordance with a data format which may be XML. After receiving the response packet, the framework determines whether the response packet contains a result to the data query. If the response packet contains a result to the data query, the framework formats the result for presentation to a user via the user interface on the local computing device. The format for presentation of the result to the user in the user interface may include presenting the result as a document, content, or in a form. If the response packet, does not contain a result to the data query the framework may send a status message, indicating that no results were returned for the data query, to the user interface.

The framework may also be operative to receive a registration request from the user interface, create a registration request packet, send the registration request packet to the remote computing device, and receive a registration response packet from the remote computing device to register the local computing device with the remote computing device. The registration response packet contains a response to the registration request. The registration request packet and the registration response packet may be formatted in XML.

Aspects of the invention may be implemented as a computer process, a computing system, or as an article of manufacture such as a computer program product or computer-readable medium. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

Figure 1:
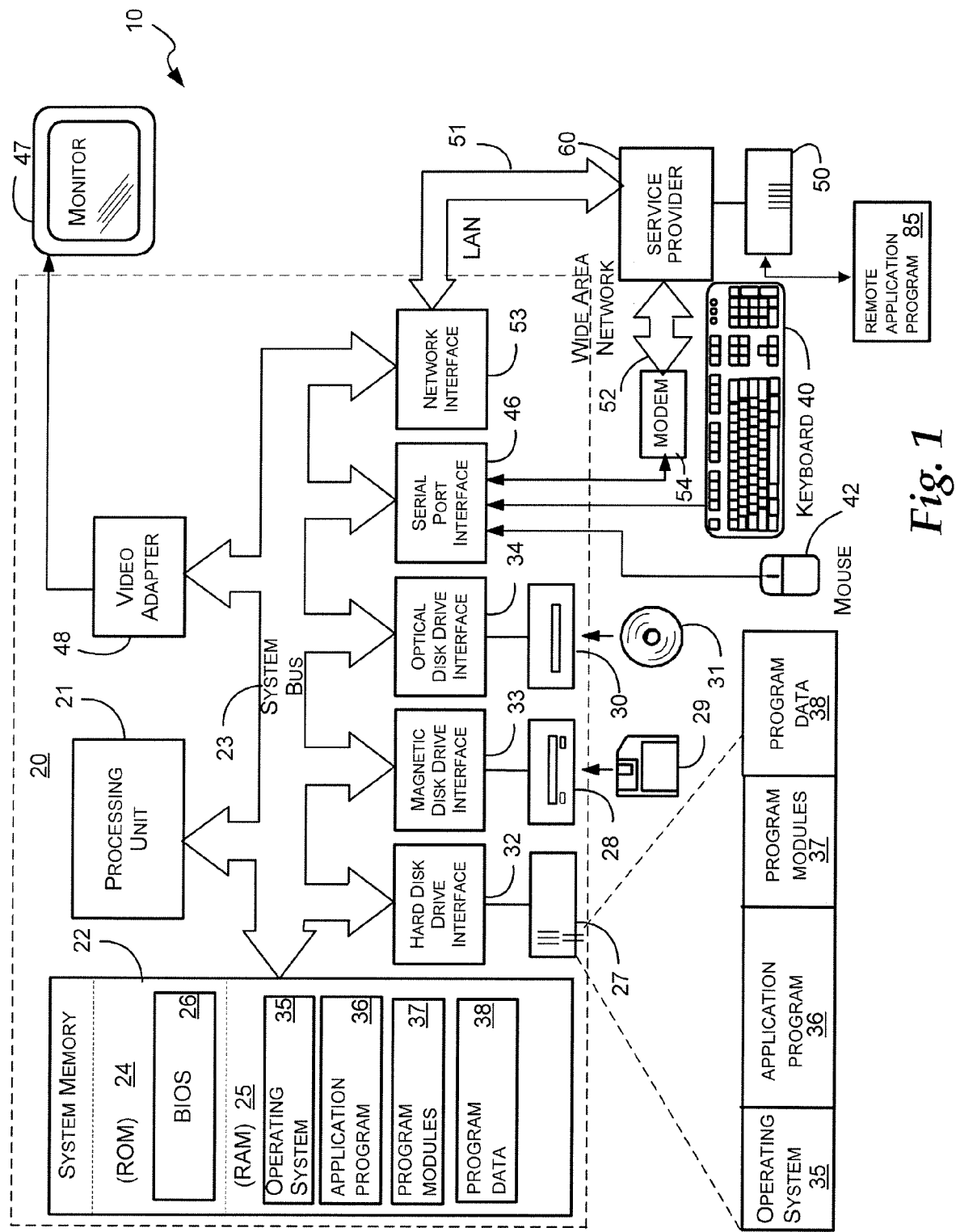
FIG. 1 illustrates an example of a suitable computing environment in which the present invention may be implemented.

The present invention is directed to a method and apparatus for formatting a query for data utilizing a standard data format and communicating the results to the query in a format for presentation to a user in a graphical user interface in a computer network. In one embodiment, the present invention is incorporated into the "OFFICE" suite of application programs that is marketed by Microsoft Corporation of Redmond Wash.

In the following detailed description, references are made to the accompanying drawings that form a part hereof, and in which are shown by way of illustration specific embodiments or examples. Referring now to the drawings, in which like numerals represent like elements through the several figures, aspects of the present invention and the illustrative operating environment will be described.

FIG. 1 illustrates an example of a suitable computing environment 10 in which the present invention may be implemented. The computing system 10 is only one example of a suitable computing environment and is not intended to suggest any limitation as to the scope of use or functionality of the invention. Neither should the computing environment 10 be interpreted as having any dependency or requirement relating to any one or combination of components illustrated in the illustrative operating environment 10.

The present invention is operational with numerous other general purpose or special purpose computing system environments or configurations. Examples of well known computing systems, environments, and/or configurations that may be suitable for use with the invention include, but are not limited to, personal computers, hand-held or laptop devices, multiprocessor systems, microprocessor-based or programmable consumer electronics, minicomputers, mainframe computers, and the like. The invention may also be practiced in distributed computing environments where tasks are performed by remote processing devices.

Those skilled in the art will recognize that the invention may be implemented in combination with various other program modules (not shown). Generally, program modules include routines, programs, components, data structures, etc., that perform particular tasks or implement particular abstract data types. Moreover, those skilled in the art will appreciate that the invention may be practiced with computer system configurations other than the one shown, that are linked through a communications network. In a distributed computing environment, program modules may be located in both local and remote memory storage devices.

Referring now to FIG. 1, an illustrative operating environment 10 for implementing the invention includes a conventional personal computer system 20, including a processing unit 21, a system memory 22, and a system bus 23 that couples the system memory to the processing unit 21. The system memory 22 includes read only memory (ROM) 24 and random access memory (RAM) 25. A basic input/output system (BIOS) 26, containing the basic routines that help to transfer information between elements within the personal computer system 20, such as during start-up, is stored in ROM 24. The personal computer system 20 further includes a hard disk drive 27, a magnetic disk drive 28, e.g., to read from or write to a removable disk 29, and an optical disk drive 30, e.g., for reading a CD-ROM disk 31 or to read from or write to other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage for the personal computer system 20. Although the description of computer-readable media above refers to a hard disk, a removable magnetic disk and a CD-ROM disk, it should be appreciated by those skilled in the art that other types of media which are readable by a computer, such as magnetic cassettes, flash memory cards, digital video disks, Bernoulli cartridges, and the like, may also be used in the exemplary operating environment.

A number of program modules may be stored in the drives and RAM 25, including an operating system 35, application program 36 (which may include word processor and spreadsheet programs), other program modules 37, and program data 38. A user may enter commands and information into the personal computer system 20 through a keyboard 40 and pointing device, such as a mouse 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a game port or a universal serial bus (USB). A monitor 47 or other type of display device is also connected to the system bus 23 via an interface, such as a video adapter 48. In addition to the monitor, personal computers typically include other peripheral output devices (not shown), such as speakers or printers. It should be understood that the application program 36 may utilize a graphical user interface ("GUI") allowing a user to input commands and information as well as display information to the user via the monitor 47.

The personal computer system 20 may operate in a networked environment using logical connections to a remote computer, such as an Information Service Provider 60. The remote computer may be a server, a router, a peer device or other common network node, and typically includes many or all of the elements described relative to the personal computer system 20, although only a memory storage device 50 has been illustrated as being associated with the Information Service Provider 60 in FIG. 1. The logical connections depicted in FIG. 1 include a local area network (LAN) 51 and a wide area network (WAN) 52. Such networking environments are commonplace in offices, enterprise-wide computer networks, intranets and the Internet.

When used in a LAN networking environment, the personal computer system 20 is connected to the LAN 51 through a network interface 53. When used in a WAN networking environment, the personal computer system 20 typically includes a modem 54 or other means for establishing communications over the WAN 52, such as the Internet. The modem 54, which may be internal or external, is connected to the system bus 23 via the serial port interface 46. In a networked environment, program modules depicted relative to the personal computer system 20, or portions thereof, may be stored in the remote memory storage device. By way of example, and not limitation, FIG. 1 illustrates a remote application program 85 residing on the memory storage device 50. It will be appreciated that the network connections shown are illustrative and other means of establishing a communications link between the computers may be used. It will further be appreciated that the invention could equivalently be implemented on host or server computer systems other than personal computer systems. The Information Service Provider 60 may, for example, contain research and reference information for providing results to data queries made from the application programs 36.

Figure 2:
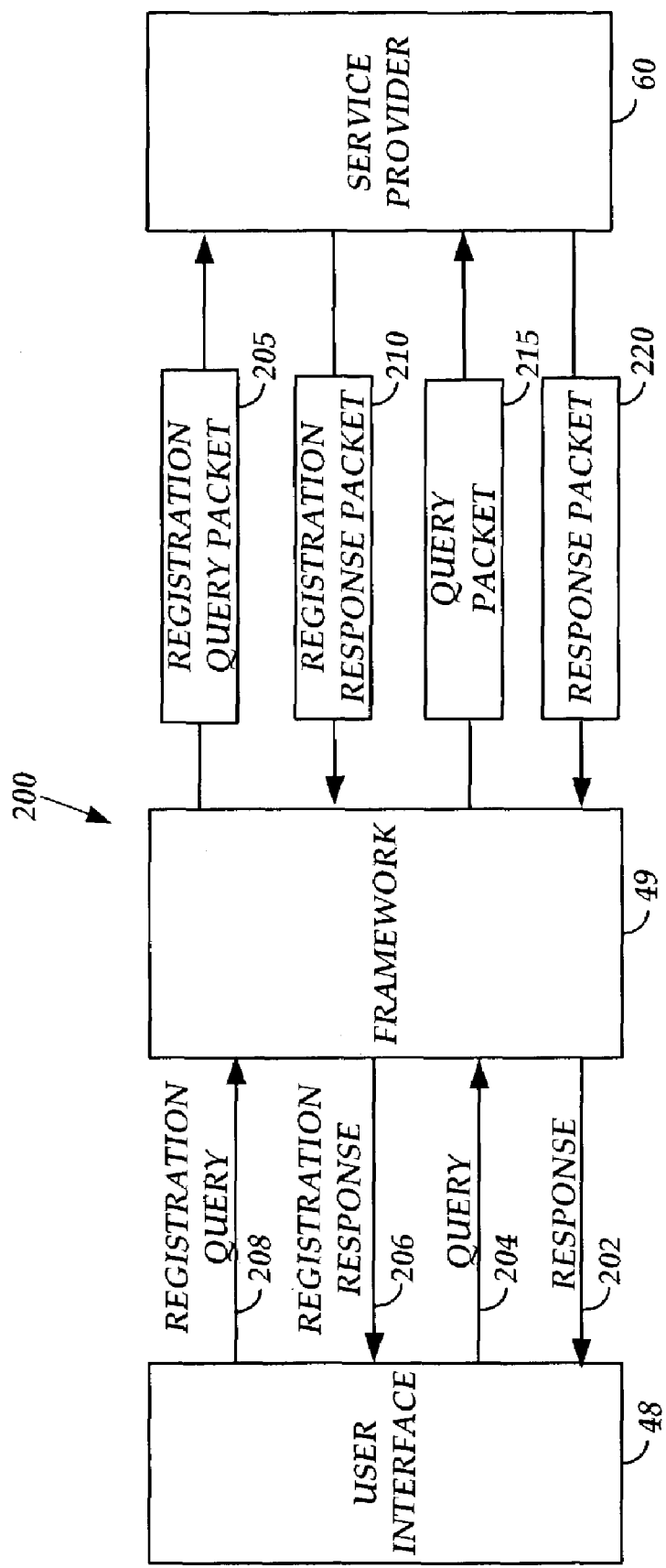
FIG. 2 shows an illustrative computing arrangement which may be utilized by the application program for communicating data from the personal computer system to the Information Service Provider in the computer network illustrated in FIG. 1 according to one embodiment of the present invention.

FIG. 2 shows an illustrative computing arrangement 200 which may be utilized by the application program 36 for communicating data from the personal computer system 20 to the Information Service Provider 60 in the computer network illustrated in FIG. 1 above. As briefly described above, the application program 36 includes a user interface 48 for allowing a user to input commands as well as receive information for display to a user on the personal computer system 20. As shown in FIG. 2, the user interface is utilized to register the personal computer system 20 with the Information Service Provider 60 by sending a registration request 208 and receiving a registration response 206. The user interface 48 is further utilized to send a query 204 to the Information Service Provider 60 and display a response 202 from the Information Service Provider 60 to the query 204. The registration request 208 and the query 204 are communicated from the user interface 48 to the Information Service Provider 60 through a framework 49. Similarly, the registration response 206 and the response 202 are communicated from the Information Service Provider 60 to the user interface 48 through the framework 49.

The framework 49 is a software component that executes in the application program 36 residing in the personal computer system 20. The framework 49 formats the registration request 208 in a registration packet 205 and formats the query 204 in a query packet 215 for transmission to the Information Service Provider 60. The framework 49 also receives a registration response packet 210 and a query packet 205 from the Information Service Provider 60.

According to one embodiment of the present invention, the data in the packets 205, 210, 215, and 220 are formatted in Extensible Markup Language ("XML"). As is understood by those skilled in the art, XML is a standard format for communicating data. In the XML data format, a schema is used to provide XML data with a set of grammatical and data type rules governing the types and structure of data that may be communicated. For example, the data in the query packet 215 may have an attached or associated schema such as "search.query.xsd" for providing an allowable set of XML elements such as a <query> element, <format> element, <context> element, and so on. The schema includes the rules governing the order with which those elements may be applied to the query data and specific rules associated with individual elements applied to the query data. For example, a schema attached or associated with the query packet 215 data may prescribe that data associated with a given element, for example a <query> element, must include a <context> element and a <query text> element.

After the registration response packet 210 and the query packet 205 have been received by the framework 49, the framework 49 implements code for transforming the packet data from XML to a format for display in the user interface 48 of the personal computer system 20. It will be understood by those skilled in the art that as a data exchange format, XML does not natively support the visual presentation of data unlike other languages such as Hypertext Markup Language ("HTML"). As a result, XML data must be "transformed" into a layout for presentation to a user. One technique for transforming XML data is through the use of Extensible Stylesheet Language (XSL) which includes a formatting language. For example, using XSL, an XML document may be formatted into a well-formed HTML file. It should be understood that the present invention is not limited to presenting XML data in HTML and that other techniques may also be utilized to render XML data. Such techniques will be understood by those skilled in the art.

All users of documents annotated with XML structure according to a given schema may utilize the data contained within the XML structure without regard to the overall type and structure of the data. For example, if the query packet, described above, is transmitted to Information Service Provider 60, the provider may develop software applications for parsing the query packet to locate specific keywords within the query packet for use by the provider to find results to the query. Using the schema, the provider will know that the data associated with the XML elements have been prepared according to the schema governing the data. Accordingly, the provider may develop a software application or a file such as an Extensible Stylesheet Language Transformation (XSLT) file, for locating query packet elements and for extracting the data associated therewith.

As understood by those familiar with the Extensible Markup Language, XML namespaces provide a method for qualifying elements and attribute names used in XML documents by associating those elements and attribute names with namespaces identified by uniform resources identifier (URI) references. An XML namespace is a collection of names, identified by a URI reference which are used in XML data files as element types and attribute names. A single XML data file may contain elements and attributes that are defined for and used by multiple software modules.

Figure 3:
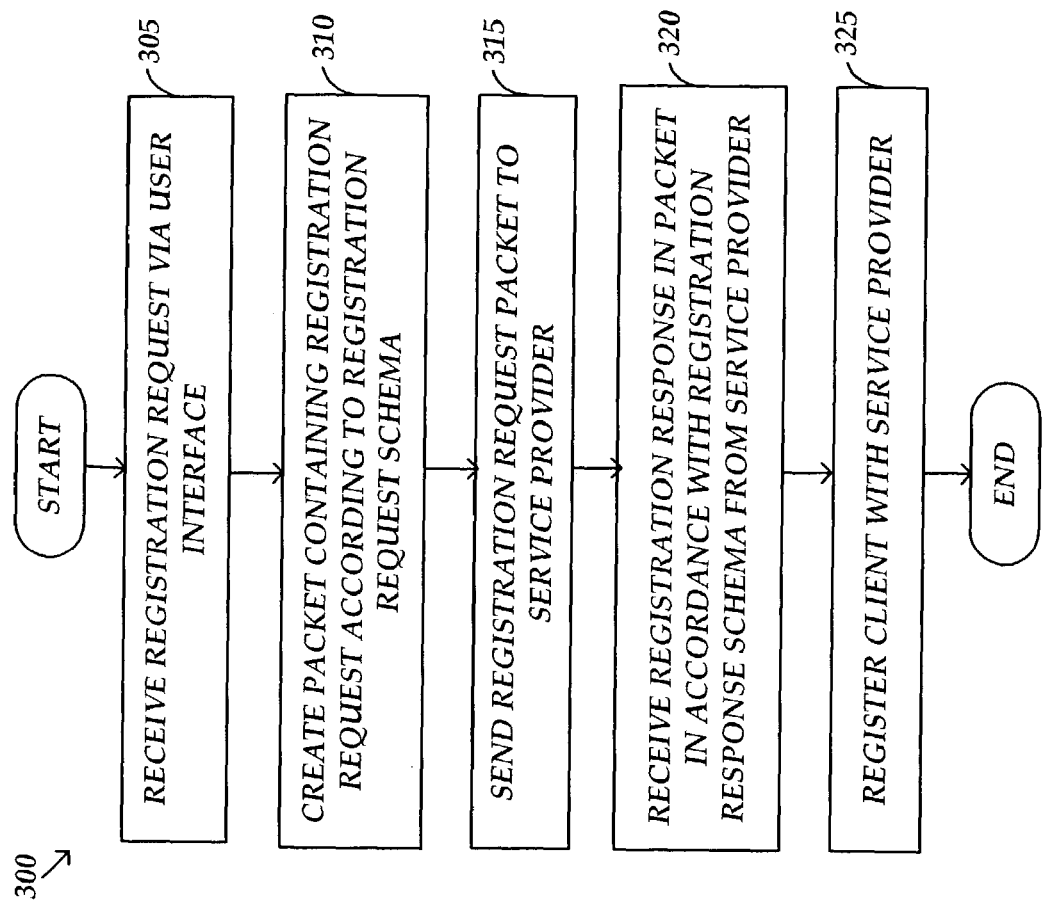
FIG. 3 illustrates logical operations for registering a computer system with an information service provider in the computing environment described in FIGS. 1-2 according to one embodiment of the present invention FIG. 4 illustrate logical operations for generating a query and presenting results to the query in the computing environment described in FIGS. 1-2 according to one embodiment of the present invention.
Figure 4:
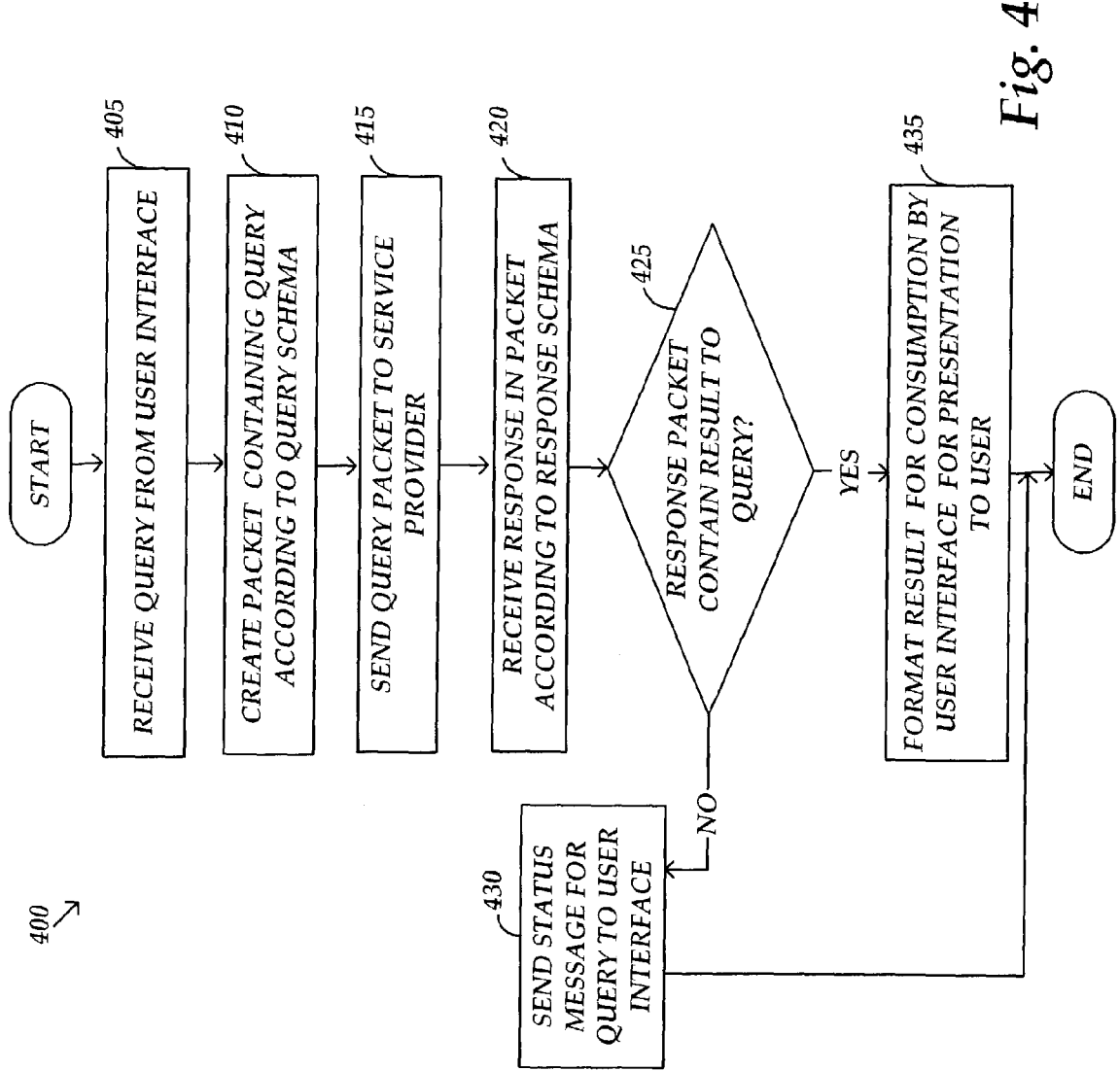

FIGS. 3-4 illustrate logical operations for registering a computer system with an information service provider, generating a query, and presenting results to the query in the computing environment described in FIGS. 1-2 above, in accordance with various embodiments of the present invention. The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Referring now to FIG. 3, the logical operations 300 begin at operation 305 where a user inputs a registration request via the user interface 48 which is then received by the framework 49 in the personal computer system 20. At operation 310, the framework 49 formats the registration request as XML and creates the registration request packet 205 including the registration request for transmission to the Information Service Provider 60. The framework 49 formats the registration request according to a registration request schema (i.e., "Search.Registration.Request") which may be attached to or associated with the registration request in the packet. The Information Service Provider 60 will then use the registration request schema to properly read and interpret the registration request. The contents of an illustrative registration request packet formatted according to a schema is shown below in Table 1.

TABLE 1

Illustrative registration request packet

```
<?xml version="1.0" encoding="utf-8" ?>
  <RegistrationRequest revision="1"
    xmlns="urn:Microsoft.Search.Registration.Request">
    <SupportedFormats>
      <Format revision="1">urn:Microsoft.Search.Response.Document:
      Document</Format>
      <Format
        revision="1">urn:Microsoft.Search.Response.Content:
        Content</Format>
      <Format
        revision="1">urn:Microsoft.Search.Response.Form:
        Form</Format>
    </SupportedFormats>
    <SystemInformation>
      <SkuLanguage>en-us</SkuLanguage>
      <LanguagePack>en-us</LanguagePack>
      <LanguagePack>de-de</LanguagePack>
      <LanguagePack>ja-jp</LanguagePack>
      <InterfaceLanguage>en-us</InterfaceLanguage>
      <Location>US</Location>
    </SystemInformation>
  </RegistrationRequest>
```

As shown in Table 1, the registration request packet includes a namespace specifying that the registration request adheres to the "Microsoft.Search.Registration.Request" schema. The packet also includes namespaces specifying the format of supported search responses (i.e., the search response may include a document, content, or a form).

Returning now to FIG. 3 the logical operations 300 continue from operation 310 to operation 315 where the framework 49 sends the registration request packet 205 over the network interface 53 to the Information Service Provider 60 which processes the registration request and creates the registration response packet 210 according to a registration response schema. The registration response schema may include, for example, a URI identifying the Information Service Provider 60. From operation 315, the logical operations continue at operation 320 where the Information Service Provider 60 transmits the registration response packet 210 over the network interface 53 to the framework 49 which then uses information contained within the registration response packet 210 to register the personal computer system 20 with the Information Service Provider 60 at operation 325. The actual registration may be accomplished by creating registry entries in the application 36 for the service provider.

According to one embodiment of the present invention, a user may register the personal computer 20 with the Information Service Provider 60 using a URL. In this embodiment, users are provided with the URL of an information service provider which is entered into the user interface 48 to register the service provider. Those skilled in the art will appreciate that a Simple Object Access Protocol (SOAP) function may be utilized at the service provider to register the user's computer. In an alternative embodiment of the present invention, a custom install application may be used to register the personal computer 20.

In some computing environments, it may be advantageous for the user to have access to multiple information services without having to individually register with each service. For example, a user writing a report about his company in a word processing application, may need access to a reference service to access articles written about the company as well as to a stock information service to access data about the company's stock performance. To this end, in an alternative embodiment of the invention, the application program 36 may be configured to communicate with a "discovery" server to facilitate the deployment of multiple information services to the user.

In this embodiment, the discovery server contains a directory listing multiple service providers. A user may be provided with a URL to the discovery server which is sent by the framework 49 to the discovery server in the registration request packet 205. After receiving the registration request packet 205, the discovery server sends a list of available information service providers in the registration response packet 210 to the framework 49. The registration response packet 210 may include a pointer or URL for each information service provider in the list. The framework 49 may then use the information contained within the registration response packet 210 to automatically register the personal computer system 20 with the available information service providers. Alternatively, the framework 49 may format the list of service providers for presentation in the user interface 48 thus enabling the user to choose which services to register. In this example, the user interface 48 may display a description of the services provided by each service provider in the list. As discussed above, the registration of the service providers may be accomplished by creating registry entries in the application 36 for each provider.

Referring now to FIG. 4, the logical operations 400 begin at operation 405 where a user inputs a data query (i.e., a string) via the user interface 48 which is then received by the framework 49 in the personal computer system 20. At operation 410, the framework 49 formats the query as XML and creates the query packet 215 including the query for transmission to the Information Service Provider 60. The framework 49 formats the query according to a query schema (i.e., "Search.Query") which may be attached to or associated with the query in the packet 215. The Information Service Provider 60 will then process the query in the query packet 215. In one embodiment, a SOAP function in the service provider may be used to process each query received from the framework 49. The framework 49 in creating the query packet 215 calls the SOAP function and passes in a string comprised of XML data adhering to the query schema. The contents of an illustrative query packet formatted according to a query schema are shown below in Table 2.

TABLE 2

Illustrative query packet

```
<?xml version="1.0" encoding="utf-8" ?>
<QueryPacket xmlns="urn:Microsoft.Search.Query" revision="1"
    build="(11.0.4916)">
    <Query domain="{2E8E1D19-A67C-4F2D-AC71-126CBC8E25CE}">
        <QueryId>{45BFF740-FF31-475A-90D8-
            9C61A449A595}</QueryId>
        <OriginatorId>{349EAD21-80B8-432f-8721-
            6801FB3E8785}</OriginatorId>
        <SupportedFormats>
            <Format
                revision="1">urn:Microsoft.Search.Response.Document:
                Document</Format>
            <Format
                revision="1">urn:Microsoft.Search.Response.Content:
                Content</Format>
            <Format
                revision="1">urn:Microsoft.Search.Response.Form:Form
                </Format>
        </SupportedFormats>
        <Context>
            <QueryText type="STRING" language="en-
                us">spy</QueryText>
            <LanguagePreference>en-us</LanguagePreference>
            <Requery/>
        </Context>
        <Range id="result" />
        <OfficeContext xmlns="urn:Microsoft.Search.Query.Office.Context"
            revision="1">
            <UserPreferences>
                <ParentalControl>false</ParentalControl>
            </UserPreferences>
            <ServiceData />
            <ApplicationContext>
                <Name>Microsoft Word</Name>
                <Version>(11.0.4916)</Version>
            </ApplicationContext>
            <QueryLanguage>en-us</QueryLanguage>
            <KeyboardLanguage>en-us</KeyboardLanguage>
        </OfficeContext>
        <Keywords xmlns="urn:Microsoft.Search.Query.Office.Keywords"
            revision="1">
            <QueryText>spy</QueryText>
            <Keyword>
                <Word>spy</Word>
                <StemWord>spy</StemWord>
                <StemWord>spy's</StemWord>
                <StemWord>spies</StemWord>
                <StemWord>spies'</StemWord>
                <StemWord>spying</StemWord>
                <StemWord>spied</StemWord>
            </Keyword>
        </Keywords>
    </Query>
</QueryPacket>
```

As shown in Table 2, the query packet 215 includes a query for the word "spy" and declares a namespace specifying that the packet adheres to the "Microsoft.Search.Query" schema. The packet also declares the namespaces it supports within the <SupportedFormats> element. Thus, the response that corresponds to the query must contain only elements in the supported namespaces. In one embodiment of the present invention, the query packet 215 may declare additional namespaces representing embedded schemas which augment or refine the query in the query packet 215. For example, the query packet 215 may include a Keywords schema for listing keywords describing the original query string. The keywords may represent various components of the query string such as spelling alternatives and word variants to make the query more flexible. For example, as shown in Table 2 above, the query packet 215 lists the keywords "spy's," "spies," "spies'," "spying," and "spied" for the original query string "spy." The Information Service Provider 60 performs a search on the original query string as well as the list of keywords. In other embodiments of the present invention the query packet 215 may include a Context schema for providing context information that may be used by the Information Service Provider 60 to better handle the query. For example, the Context schema may include a <ParentalControl> element for filtering content returned for the query by the Information Service Provider 60.

Returning now to FIG. 4 the logical operations 400 continue from operation 410 to operation 415 where the framework 49 sends the query packet 215 over the network interface 53 to the Information Service Provider 60 which processes the query and creates the response packet 220 according to a response schema. The Information Service Provider 60 returns a response for every query in the query packet 215 in the response packet 220. It should be understood that a query packet may contain multiple queries if, for example, a particular service provider offers different domains or services which are registered with a client computer via the registration process.

The logical operations 400 continue from operation 415 to operation 420 where the framework 49 receives the response packet 220 over the network interface 53 from the Information Service Provider 60. At operation 425, the framework 49 receives the determines whether the results packet 220 contains at least one result to the data query. This determination may be made by the application program 36 parsing the XML data in the response packet for a string associated with an XML element indicating the status of the query. For example, the XML data in the response packet may include a <Status> element having a value of "SUCCESS" if the response packet includes at least one result to the query or a value indicating that the query was unsuccessful (such as an error message) if the response packet does not include a result to the query.

The application program 36 may include a parser (not shown) for parsing the XML data. It will be appreciated that the functionality of the parser may be implemented by a Document Object Model ("DOM") parser in conjunction with a Simple API for XML ("SAX") parser. As is known to those skilled in the art, DOM parsers are tree-based parsers which load an entire XML file into memory and SAX parsers are event-based parsers capable of reading XML nodes (elements or attributes) sequentially, one at a time. An example of a DOM parser is MSXML DOM provided by Microsoft Corporation of Redmond, Wash. In one embodiment of the invention, the DOM parser may be used to receive the XML data and the SAX parser is used to read each node.

If at operation 425 the framework 49 determines that no results were returned in the response packet 220 (e.g., the <Status> element indicates that the query was unsuccessful), then the framework 49 sends a status message indicating the at the search was unsuccessful to the user interface 48 at operation 430. If, on the other hand, at operation 425 the framework 49 determines that there is at least one result returned for the query (e.g., the <Status> element indicates that the query was a success) then the framework 49 formats each returned result for consumption by the user interface 48 for presentation to the user at operation 435. As discussed above in the discussion of FIG. 2, the XML data containing the results may be formatted for consumption by the user interface 48 by utilizing XSL to transform the XML in to HTML for presentation to a user.

Figure 5C:
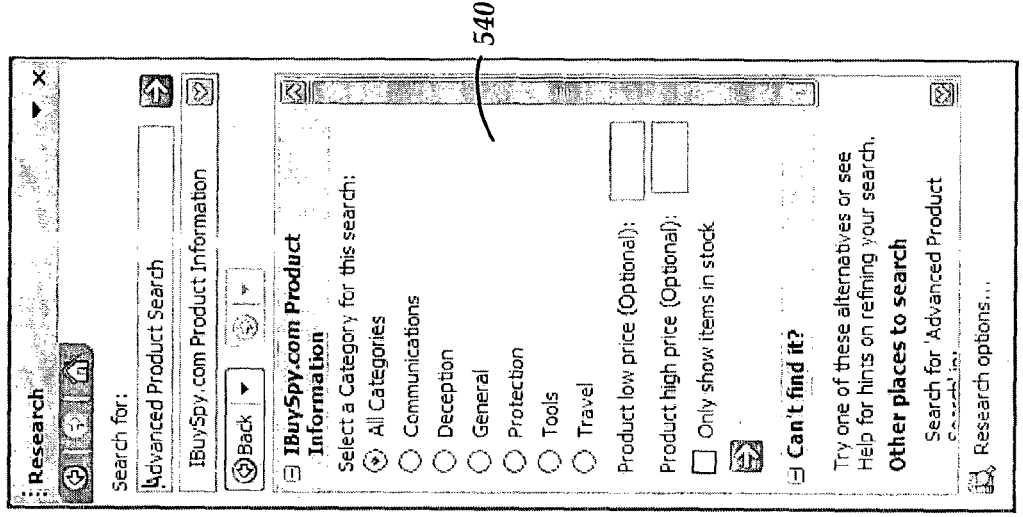
FIG. 5C shows an illustrative screenshot of a graphical user interface for entering and displaying the results to a data query according to one embodiment of the present invention.
Figure 5B:
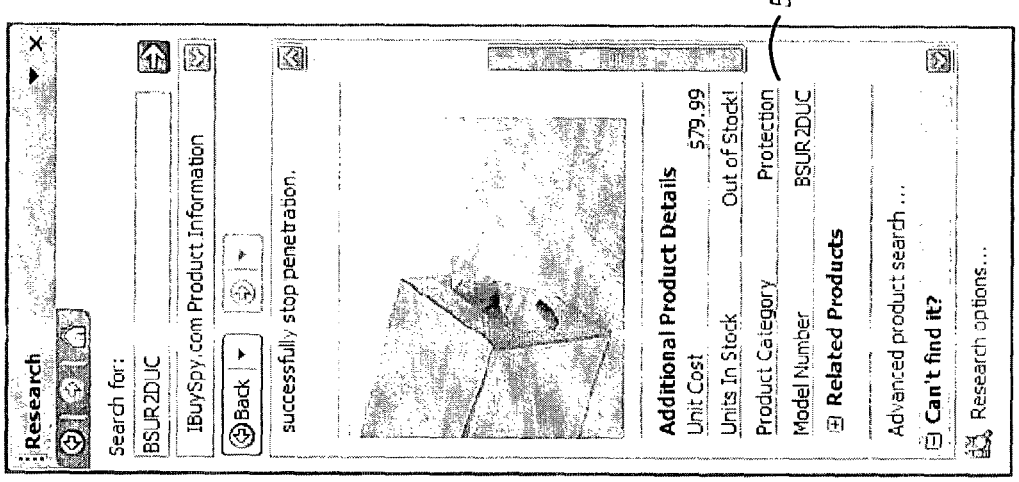
FIG. 5B shows an illustrative screenshot of a graphical user interface for entering and displaying the results to a data query according to one embodiment of the present invention.
Figure 5A:
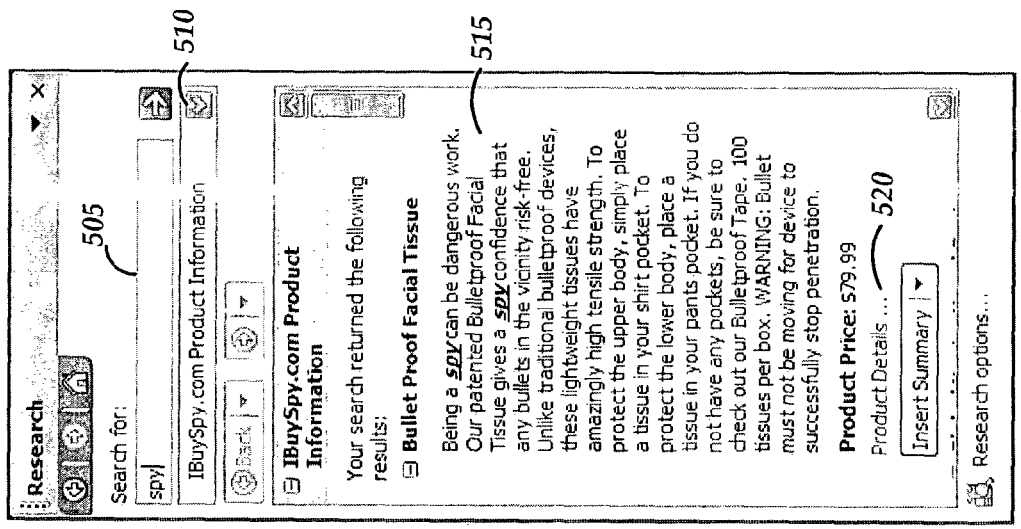
FIG. 5A shows an illustrative screenshot of a graphical user interface for entering and displaying the results to a data query according to one embodiment of the present invention.

FIGS. 5A-5C show illustrative screenshots of the user interface 48 which is utilized for entering a query and displaying results from the Information Service Provider 60 as discussed in detail in FIGS. 1-4 and Tables 1-2, above. As shown in FIG. 5A, the screenshot includes a query box 505 for entering the query "spy" and a service provider box 510 identifying the service provider as IBuySpy.com Product Information. As discussed above, the user may be register a client computer with the service provider by entering a URL which is then sent to the service provider in a registration request packet by the framework 49. The service provider then returns a registration response packet to the framework 49 to register the service with the client computer.

The results box 515 shows a result to the query which has been formatted for display in the user interface 48 by the framework 49. As shown in FIG. 5A, the result to the query is an advertisement for "Bullet Proof Facial Tissue." The "Product Details" link 520, when selected by a user, produces another query to the Information Service Provider 60 the results of which are sent to the user interface 48 through the framework 49 and displayed in a table format as shown in box 530 in FIG. 5B. Similarly, the "Advanced Product Search" link 535, when selected by a user, produces yet another query to the Information Service Provider 60 the results of which are sent to the user interface 48 through the framework 49 and displayed as a form as shown in box 540 in FIG. 5C. As described above, the registration request and query schemas may declare namespaces defining the format in which the results to a query from the Information Service Provider 60 may take. Thus, as shown in FIGS. 5A-5C above, the results to a query may be presented as a document, content, or in a form.

It should be understood that the above descriptions of the elements for the schemas utilized by the registration request packet 205, the registration response packet 210, the query packet 215, and the response packet 220 are illustrative only and are not intended to suggest any limitation as to the scope of use or functionality of the invention. It will be appreciated by those skilled in the art that the above-described schemas may define other elements and/or attributes in addition to those specifically discussed above.

In view of the foregoing, it will be appreciated that the present invention provides a method and apparatus for formatting a query for data utilizing a standard data format such as XML, and communicating the results to the query in a format for presentation to a user in a graphical user interface in a computer network. While the invention has been particularly shown and described with reference to illustrative embodiments thereof, it will be understood by those skilled in the art that various other changes in the form and details may be made therein without departing from the spirit and scope of the invention.

What is claimed is:

1. A method of communicating results to a search query for data in a computer network utilizing a graphical user interface resident on a local computing device, the method comprising:
   providing a framework in communication with the graphical user interface and the remote computing device operable to translate requests from the graphical user interface in a non-extensible markup language (XML) format to an XML format;
   receiving a non-XML search registration query from the graphical user interface to access the remote computing device for conducting search queries to search data associated with the remote computing device for a string of data;
   translating the non-XML search registration query into an XML search registration query packet according to a search registration request schema associated with the XML search registration query packet;
   sending the XML search registration query packet to the remote computing device;
   receiving an XML search registration response packet from the remote computing device;
   translating the XML search registration response packet into a non-XML search registration response;
   sending the non-XML search registration response to the graphical user interface;
   receiving a non-XML search query for data from the graphical user interface;
   translating the non-XML search query into an XML search query packet;
   sending the XML search query packet to the remote computing device;
   receiving an XML search response packet from the remote computing device;
   determining whether the XML search response packet contains at least one search result to the search query; and
   translating the at least one search result from the XML search response packet into a non-XML search response for presentation to a user on the local computing device via the graphical user interface when the search response packet contains the at least one search result to the search query for data.

2. The method of claim 1, further comprising sending a status message to the user interface when the search response packet does not contain the at least one search result to the search query for data.

3. The method of claim 2, wherein the status message comprises a notification that no results were returned for the search query for data.

4. The method of claim 1, further comprising registering the local computing device with a remote computing device in the computer network.

5. The method of claim 1, wherein formatting the at least one search result for presentation to a user on the local computing device via the user interface comprises transforming the at least one search result into a format for presentation to the user in the user interface.

6. The method of claim 1, wherein the local computing device is a client in the computer network.

7. The method of claim 1, wherein the remote computing device is an information service provider in the computer network.

8. A computer-readable storage medium including a physical recording medium on which are stored computer-executable instructions for performing the method of claim 1.

9. The method of claim 1, wherein the search registration request schema is associated with the XML search registration query packet on the local computing device and the remote computing device by the search registration request schema being at least one of:
   associated with the XML search query packet both at the local computing device and the remote computing device; and
   attached to the XML search query packet upon the local computing device sending the XML search registration query packet to the remote computing device.

10. The method of claim 1, wherein registering the local computing device with the remote computing device includes at least one of:
   a registration URL identifying the remote computing device being provided to be entered into the graphical user interface of the local computing device to register the local computing device with the remote computing device;
   a Simple Object Access Protocol (SOAP) function being implemented on the remote computing device to register the local computing device with the remote computing device; and
   a custom install application being implemented to register the local computing device with the remote computing device.

11. A system for communicating results to a query for data in a computer network, the system comprising:
   a processor;
   a computer readable storage medium including instructions that describe:
   a user interface resident on a local computing device in the computer network for creating the query for data; and
   a framework, resident on the local computing device and in communication with the user interface, operative to:
      receive a search registration request from the user interface to register for conducting search queries to search data associated with the remote computer for a search string, the query adhering to a non-extensible markup language (XML) format;
      translate the non-XML search registration request into an XML search registration query packet prepare according to an associated registration request schema included in the XML registration query packet;
      send the XML search registration query packet to the remote computer;
      receive an XML search registration response packet from the remote computer;
      translate the XML search registration response packet into a non-XML search registration response;
      send the non-XML search registration response to the user interface;
      receive a non-XML query for data from the user interface;
      translate the non-XML query into an XML query packet;
      send the XML search query packet to the remote computer to search the data associated with the remote computer for the search string; and
      receive an XML response packet from the remote computer;
   wherein:
   the framework, after receiving the XML response packet, is operative to determine whether the response packet contains at least one result to the query;
   the framework is operative to translate at least one result from the XML response packet into a non-XML format for presentation to a user via the user interface when the response packet contains the at least one result to the query; and
   the framework is operative to send a status message to the user interface when the response packet does not contain the at least one result to the query.

12. The system of claim 11, wherein the framework in formatting the at least one result for presentation to a user on the local computing device via the user interface is operative to transform the at least one result into a format for presentation to the user in the user interface.

13. The system of claim 12, wherein the format for presentation of the at least one result to the user in the user interface comprises a document.

14. The system of claim 12, wherein the format for presentation of the at least one result to the user in the user interface comprises a form.

15. The system of claim 12, wherein the format for presentation of the at least one result to the user in the user interface comprises content.

16. The system of claim 11, wherein the remote computer is an information service provider in the computer network.

17. The system of claim 11, wherein the system is operative to register the local computing device with the remote computing device by at least one of:
   a registration URL identifying the remote computing device being provided to be entered into the graphical user interface of the local computing device to register the local computing device with the remote computing device;
   a Simple Object Access Protocol (SOAP) function being implemented on the remote computing device to register the local computing device with the remote computing device; and
   a custom install application being implemented to register the local computing device with the remote computing device.

18. A method of communicating results to a query for data in a computer network utilizing a graphical user interface resident on a local computing device, the method comprising:
   receiving a request in a non-extensible markup language (XML) format for registering the local computing device with a remote computing device in the computer network utilizing the user interface; wherein the request is a request to register for searching data associated with the remote computing device for search strings;
   translating the request into an XML format request packet and causing the translated request to be transmitted to the remote computing device to register the local computing device with the remote computing device by one of:
   a registration URL identifying the remote computing device being provided to be entered into the graphical user interface of the local computing device to register the local computing device with the remote computing device;
   a Simple Object Access Protocol (SOAP) function being implemented on the remote computing device to register the local computing device with the remote computing device; and
   a custom install application being implemented to register the local computing device with the remote computing device;
   upon receiving a response packet from the remote computing device, receiving the query for data from the user interface, the query adhering to a non-XML format;
   translating the received query from the non-XML format to an XML query packet format;
   sending the query packet to the remote computing device;
   receiving an XML response packet from the remote computing device;
   determining whether the response packet contains at least one result to the query;
   translating the at least one result in response packet into the non-XML format for presentation to a user on the local computing device via the user interface when the response packet contains the at least one result to the query; and sending a status message to the user interface when the response packet does not contain the at least one result to the query.

19. The method of claim 18, wherein translating the request into an XML format request packet is performed according to a registration request schema associated with the XML registration query packet on the local computing device and the remote computing device.

20. The method of claim 19, wherein the registration request schema is associated with the XML registration query packet by transmitting the registration request schema with the XML registration query packet to the remote computing device.

* * * * *